(12) United States Patent
Kato et al.

(10) Patent No.: US 6,894,114 B2
(45) Date of Patent: May 17, 2005

(54) BLOCK COPOLYMER

(75) Inventors: Masaji Kato, Ibaraki-Pref. (JP);
Kenichi Hamada, Ibaraki-Pref. (JP);
Kazushige Ishiura, Osaka (JP);
Yoshihiro Morishita, Ibaraki-Pref. (JP)

(73) Assignee: Kuraray Co., Ltd., Kurashiki (JP)

( * ) Notice: Subject to any disclaimer, the term of this patent is extended or adjusted under 35 U.S.C. 154(b) by 57 days.

(21) Appl. No.: 10/381,198

(22) PCT Filed: Sep. 17, 2001

(86) PCT No.: PCT/JP01/08050

§ 371 (c)(1),
(2), (4) Date: Mar. 27, 2003

(87) PCT Pub. No.: WO02/26847

PCT Pub. Date: Apr. 4, 2002

(65) Prior Publication Data

US 2004/0034183 A1 Feb. 19, 2004

(30) Foreign Application Priority Data

Sep. 28, 2000 (JP) ........................................ 2000-296495

(51) Int. Cl.$^7$ ............................................ C08F 297/02
(52) U.S. Cl. ........................ 525/94; 525/222; 525/299; 525/250; 525/271; 525/302; 526/318.44; 526/319
(58) Field of Search ......................... 525/94, 222, 299, 525/250, 271, 302; 526/318.44, 319

(56) References Cited

U.S. PATENT DOCUMENTS 5,264,527 A 11/1993 Varshney et al.
5,391,628 A 2/1995 Gaillard et al.
5,756,585 A * 5/1998 Teyssie et al. ............... 525/299

FOREIGN PATENT DOCUMENTS

| EP | 945470 | 9/1999 |
| JP | 10-017633 | 1/1998 |
| WO | 93/17057 | 9/1993 |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

A block copolymer is obtained by anionic polymerization, includes two or more polymer blocks A miscible with each other, and at least one (meth)acrylic ester polymer block B immiscible with the polymer blocks A, has a ratio [Mn$(A_{max})$/Mn$(A_{min})$] of 2 or more, wherein the ratio [Mn$(A_{max})$/Mn$(A_{min})$] is the ratio of the largest number average molecular weight [Mn$(A_{max})$] to the smallest number average molecular weight [Mn$(A_{min})$] among the polymer blocks A, has at least one block bonding including polymer block $A_{max}$-polymer block B-polymer block $A_{min}$, and has a total content of the polymer blocks A ranging from 20 wt % to 45 wt % based on the total mass of the block copolymer.

This invention provides block copolymers having two or more polymer blocks A miscible with each other and at least one (meth)acrylic ester polymer block B immiscible with the polymer blocks A and exhibiting satisfactory flexibility, melt fluidity, moldability, coatability, mechanical properties, and other properties. The block copolymers of the present invention can yield molded articles having reduced anisotropy and surface stickiness and excellent mechanical properties and pressure-sensitive adhesive compositions having excellent adhesive properties.

17 Claims, 2 Drawing Sheets

⊢—⊣ 0.1 μm   100,000×

⊢—⊣ 0.1 μm   100,000×

0.1 μm    100,000×

0.1 μm    100,000×

BLOCK COPOLYMER

TECHNICAL FIELD

The present invention relates to a block copolymer obtained by anionic polymerization, a production process thereof, a molded article comprising the block copolymer, and a pressure-sensitive adhesive composition containing the block copolymer. More specifically, it relates to a specific block copolymer being obtained by anionic polymerization and comprising two or more polymer blocks A miscible with each other and at least one (meth)acrylic ester polymer block B immiscible with the polymer blocks A, a process for producing the same by anionic polymerization, a molded article obtained from the block copolymer, and a pressure-sensitive adhesive composition containing the block copolymer.

The block copolymer of the present invention has properties as a thermoplastic elastomer or soft resin, has a low melt viscosity and excellent melt fluidity and exhibits high moldability and high strength. When the block copolymer is formed into, for example, a molded article, the resulting molded article has satisfactory strength and other mechanical properties and reduced anisotropy. Accordingly, the block copolymer of the present invention is useful as a polymer material for the production of molded articles.

When the block copolymer of the present invention is incorporated with appropriate additives such as a tackifier to thereby yield a pressure-sensitive adhesive composition, the resulting pressure-sensitive adhesive composition has a low melt viscosity, satisfactory melt fluidity and excellent coatability and can thereby yield pressure-sensitive adhesive products such as pressure-sensitive adhesive tapes with high processability. The resulting pressure-sensitive adhesive products obtained from the pressure-sensitive adhesive composition has satisfactory adhesive properties, reduced anisotropy and are thereby resistant to warpage and other disadvantages. The block copolymer of the present invention is therefore also useful as a polymer material for the production of pressure-sensitive adhesive compositions.

The term "(meth)acrylic ester" as used herein is a generic name for a "methacrylic ester" and an "acrylic ester". The term "(meth)acrylic" is a generic name for "methacrylic" and "acrylic".

BACKGROUND ART

Certain triblock copolymers have been known, each of which comprises an acrylic ester polymer block as a central block and other polymer blocks such as methacrylic ester polymers combined at both ends of the central block (Japanese Examined Patent Application Publication No. 25859 of 1995 corresponding to U.S. Pat. No. 5,264,527). In this technique, the triblock copolymers are prepared by anionic polymerization using an organic alkali metal compound or an organic alkaline earth metal compound as a polymerization initiator.

However, this conventional technique is mainly intended to provide a triblock copolymer having a narrow molecular weight distribution in terms of a molecular weight polydispersity (Mw/Mn) of from 1.05 to 2.0 but is not specifically intended to improve mechanical properties and flexibility in, and to impart isotropy to, such triblock copolymers and molded articles obtained therefrom.

The present inventors have found that, by subjecting an acrylic ester and another (meth)acrylic ester monomer different from the acrylic ester in the presence of an organic lithium compound and a specific organoaluminum compound, a block copolymer having a polymer block comprising the acrylic ester and another block copolymer comprising the other (meth)acrylic ester monomer can be produced in a high purity and a high safety with a high block efficiency even without the use of a polar organic solvent, and have filed a Japanese patent application (Japanese Unexamined Patent Application Publication No. 11-335432).

After intensive investigations in consideration of these conventional technologies, the present inventors have found the following findings (i) to (v) relating to a block copolymer having at least two polymer blocks miscible with each other and at least one (meth)acrylic ester polymer block immiscible with the polymer blocks (hereinafter may be referred to as "(meth)acrylic block copolymer"):

(i) The (meth)acrylic block copolymer exhibits varying flexibility depending on the content of a polymer block working as a soft segment.

(ii) To obtain a (meth)acrylic block copolymer having high flexibility, the content of a polymer block working as a soft segment may be generally increased. However, surface gluing (adhesion) of the (meth)acrylic block copolymer and articles obtained therefrom increases with an increasing content of the polymer block. Consequently, when the target (meth)acrylic block copolymer having high flexibility is obtained in the form of grains such as pellets or in the form of powders, the grains or powders are stuck together to thereby deteriorate handleability, or the resulting molded article has a tack on its surface or exhibits deteriorated appearance due to attached dust.

(iii) In general, to obtain a molded article having high strength and exhibiting less sticky, the content of a polymer block working as a hard segment may be increased (the content of a polymer block serving as a soft segment may be decreased) to thereby yield a (meth)acrylic block copolymer having somewhat lower flexibility. However, the resulting molded article prepared by melt molding of the (meth)acrylic block copolymer exhibits increasing anisotropy and thereby significantly increases differences in mechanical properties depending on the angle to a melt flow direction of the polymer in melt molding with an increasing content of the polymer block working as the hard segment or with a decreasing content of the polymer block working as the soft segment. For example, the molded article prepared by melt molding of the (meth) acrylic block copolymer having somewhat lower flexibility exhibits elasticity and can thereby sufficiently elongate in a traversal direction to the flow direction of the polymer in melt molding but may exhibit insufficient elasticity and may thereby elongate insufficiently in a direction in parallel with the flow direction.

(iv) A molded article prepared by injection-molding such a (meth)acrylic block copolymer having somewhat lower flexibility as described in (iii) often brings disadvantages such as molding shrinkage, warpage, and distortion.

(v) To obtain a pressure-sensitive adhesive composition having high cohesion (creep property)) by using a (meth)acrylic block copolymer as a base polymer in combination with other additives such as a tackifier, the content of a polymer block working as a hard segment may be increased (the content of a polymer block working as a soft segment may be decreased) to thereby yield a (meth)acrylic block copolymer having somewhat lower flexibility. However, the resulting pressure-sensitive adhesive composition may often exhibit decreased adhesive strength and tackiness. Pressure-sensitive adhesive products such as pressure-sensitive adhesive tapes obtained from the pressure-sensitive adhesive composition exhibit anisotropy in their pressure-sensitive adhesive layer and often bring warpage.

In addition, the present inventors have found the following problems (vi) and (vii).

(vi) To yield a (meth)acrylic block copolymer having satisfactory elastomeric properties, the glass transition temperature of a polymer block working as a hard segment must be equal to or higher than room temperature. To use the block copolymer as an elastomer at higher temperatures, the glass transition temperature is preferably further higher. Certain methacrylic ester polymer blocks have been conventionally known as polymer blocks to constitute a hard segment. However, it takes a long time to polymerize such methacrylic esters and thereby it takes a long time to prepare such (meth)acrylic block copolymers.

(vii) It takes a shorter time to polymerize acrylic esters than to polymerize methacrylic esters, and these acrylic esters are suitable for the preparation of (meth)acrylic ester block copolymers.

However, such an acrylic ester polymer generally has a low glass transition temperature, and the resulting acrylic ester polymer block cannot significantly work as a hard segment. Among such acrylic ester polymers, an isobornyl acrylate polymer is known as a polymer having a relatively high glass transition temperature. However, isobornyl acrylate has a small difference in boiling point with an alcohol contaminated as an impurity during its production and cannot be significantly purified according to a conventional purification process such as distillation, and this type of acrylic esters are not suitable for anionic polymerization.

Accordingly, an object of the present invention is to provide a (meth)acrylic block copolymer obtained by anionic polymerization and comprising at least two polymer blocks miscible with each other and at least one (meth) acrylic ester polymer block immiscible with the miscible polymer blocks, which block copolymer has a low melt viscosity and exhibits satisfactory melt fluidity, high moldability and coatability, and excellent elasticity and mechanical properties.

Another object of the present invention is to provide the (meth)acrylic block copolymer which has reduced mechanical anisotropy and excellent isotropy and can thereby yield a molded article having mechanical properties not significantly varying between a melt flow direction of polymers in its molding and another direction.

Still another object of the present invention is to provide the (meth)acrylic block copolymer that can yield a target molded article with high dimensional accuracy without disadvantages such as molding shrinkage, warpage, and distortion.

Yet another object of the present invention is to provide a novel (meth)acrylic block copolymer having at least one acrylic ester polymer block as a hard segment.

Another object of the present invention is to provide a process for easily producing the (meth)acrylic block copolymer.

Still another object of the present invention is to provide a molded article that comprises the (meth)acrylic block copolymer, has reduced anisotropy and exhibits excellent mechanical properties and dimensional accuracy.

Yet another object of the present invention is to provide a pressure-sensitive adhesive composition that comprises the (meth)acrylic block copolymer, has a low melt viscosity, exhibits satisfactory processability in a coating process and other processes for the production of pressure-sensitive adhesive tapes and other pressure-sensitive adhesive products and exhibits satisfactory adhesive properties.

DISCLOSURE OF INVENTION

The present inventors have made intensive investigations to achieve the above objects.

Consequently, the present inventors have found that a (meth)acrylic block copolymer comprising two or more polymer blocks miscible with each other and at least one (meth)acrylic ester polymer block immiscible with the miscible polymer blocks can have a decreased melt viscosity and excellent melt fluidity, can yield molded articles, pressure-sensitive adhesive tapes, other pressure-sensitive adhesive products, and other products with high productivity and can have satisfactory flexibility and mechanical properties, by setting a ratio $[Mn(A_{max})/Mn(A_{min})]$ at 2 or more, wherein the ratio $[Mn(A_{max})/Mn(A_{min})]$ is the ratio of the largest number average molecular weight $[Mn(A_{max})]$ to the smallest number average molecular weight $[Mn(A_{min})]$ among the two or more polymer blocks A miscible with each other and by setting the total content of the two or more polymer blocks miscible with each other within a range from 20 wt % to 45 wt % based on the total weight of the (meth)acrylic block copolymer.

They also have fond that the resulting molded article produced from the (meth)acrylic block copolymer has reduced mechanical anisotropy, exhibits mechanical properties not significantly varying between a flow direction of polymers in melt molding and another direction, has satisfactory isotropy, does not bring molding shrinkage, warpage, and distortion and has satisfactory dimensional accuracy.

In addition, they have found that, among these (meth) acrylic block copolymers, a (meth)acrylic block copolymer containing an acrylic ester polymer block as at least one of the two or more polymer blocks miscible with each other has typically excellent elastomeric properties and adhesive properties and is useful as a polymer material in pressure-sensitive adhesives. The present invention has been accomplished based on these findings.

Specifically, the present invention provides:

(1) A block copolymer:
(a) being an anionic polymerization product;
(b) comprising two or more polymer blocks A being miscible with each other, and at least one (meth)acrylic ester polymer block B being immiscible with the polymer blocks A;
(c) having a ratio $[Mn(A_{max})/Mn(A_{min})]$ of 2 or more, where the ratio $[Mn(A_{max})/Mn(A_{min})]$ is the ratio of the largest number average molecular weight $[Mn(A_{max})]$ to the smallest number average molecular weight $[Mn(A_{min})]$ among the two or more polymer blocks A;
(d) having at least one block bonding represented by following Formula (I):

$$(-)A_{max}-B-A_{min}(-) \quad (I)$$

wherein $A_{max}$ is the polymer block $A_{max}$ having the largest number average molecular weight among the polymer blocks A; $A_{min}$ is the polymer block $A_{min}$ having the smallest number average molecular weight among the polymer blocks A; B is the polymer block B; "—" is a chemical bond connecting between polymer blocks; and (—) means that a chemical bond is present or not; and (e) having a total content of the polymer blocks A ranging from 20 wt % to 45 wt % based on the total weight of the block copolymer.

The present invention also provides:

(2) the block copolymer according to (1), which is a block copolymer obtained by anionic polymerization using an organic alkali metal compound and/or an organic alkaline earth metal compound as a polymerization initiator;

(3) the block copolymer according to (1) or (2), wherein at least one of the two or more polymer blocks A has a glass transition temperature above 25° C., and the polymer block B has a glass transition temperature of lower than or equal to 25° C.;

(4) the block copolymer according to any one of (1) to (3), wherein the polymer block $A_{min}$ has a number average molecular weight ranging from 1000 to 15000;

(5) the block copolymer according to any one of (1) to (4), wherein the polymer blocks A are (meth)acrylic ester polymer blocks that are immiscible with the polymer block B;

(6) the block copolymer according to any one of (1) to (5), wherein the polymer blocks A can form a sphere microphase separation structure in a melt-blended material;

(7) the block copolymer according to any one of (1) to (6), which is a triblock copolymer having a block sequence represented by following Formula (II):

$$A_{max}\text{—}B\text{—}A_{min} \tag{II}$$

wherein $A_{max}$ is the polymer block $A_{max}$ having the largest number average molecular weight among the polymer blocks A; $A_{min}$ is the polymer block $A_{min}$ having the smallest number average molecular weight among the polymer blocks A; B is the polymer block B; and "—" is a chemical bond connecting between polymer blocks;

(8) the block copolymer according to (7), which is a triblock copolymer containing methacrylic ester polymer blocks miscible with each other as $A_{max}$ and $A_{mi}$, and an acrylic ester polymer block immiscible with $A_{max}$ and $A_{min}$ as B; and (9) the block copolymer according to (7), which is a triblock copolymer containing a methacrylic ester polymer block as $A_{max}$, an acrylic ester polymer block miscible with $A_{max}$ as $A_{min}$, and an acrylic ester polymer block immiscible with $A_{max}$ and $A_{min}$ as B.

The present invention also provides:

(10) a process for producing a block copolymer, the process comprising:

(i) performing anionic polymerization using an organic alkali metal compound and/or an organic alkaline earth metal compound as a polymerization initiator to thereby yield the block copolymer according to (1);

(ii) controlling a ratio ($W_{max}/W_{min}$) at 2 or more in the production of the block copolymer, wherein the ratio ($W_{max}/W_{min}$) is the ratio of the mass ($W_{max}$) of a monomer used for forming a polymer block $A_{max}$ to the mass ($W_{min}$) of a monomer used for forming a polymer block $A_{min}$ to yield polymer blocks as the two or more polymer blocks A constituting the block copolymer and being miscible with each other to thereby ensure the resulting block copolymer to have a ratio [$Mn(A_{max})$/$Mn(A_{min})$] of 2 or more, wherein the ratio [$Mn(A_{max})$/$Mn(A_{min})$] is the ratio of the largest number average molecular weight [$Mn(A_{max})$] to the smallest number average molecular weight [$Mn(A_{min})$] among the polymer blocks A;; and (iii) controlling the total amount of monomers for forming the polymer blocks A within a range from 20 wt % to 45 wt % based on the total amount of monomers for forming the block copolymer.

The present invention further provides:

(11) a process for producing a triblock copolymer, the process comprising:

(i) performing anionic polymerization using an organic alkali metal compound and/or an organic alkaline earth metal compound as a polymerization initiator to thereby yield the triblock copolymer according to (7);

(ii) controlling a ratio ($W_{max}/W_{min}$) at 2 or more in the production of the block copolymer, wherein the ratio ($W_{max}/W_{min}$) is the ratio of the mass ($W_{max}$) of a monomer used for forming a polymer block $A_{max}$ to the mass ($W_{min}$) of a monomer used for forming a polymer block $A_{min}$; and (iii) controlling the total amount of monomers for forming the polymer block $A_{max}$ and the polymer block $A_{min}$ within a range from 20 wt % to 45 wt % based on the total amount of monomers for forming the block copolymer; and

(12) the process according to one of (10) and (11), further comprising using an organoaluminum compound as a co-catalyst.

In addition and advantageously, the present invention provides:

(13) a molded article comprising the block copolymer of any one of (1) to (9); and

(14) a pressure-sensitive adhesive composition comprising the block copolymer of any one of (1) to (9).

BEST MODE FOR CARRYING OUT THE INVENTION

Figure 1:
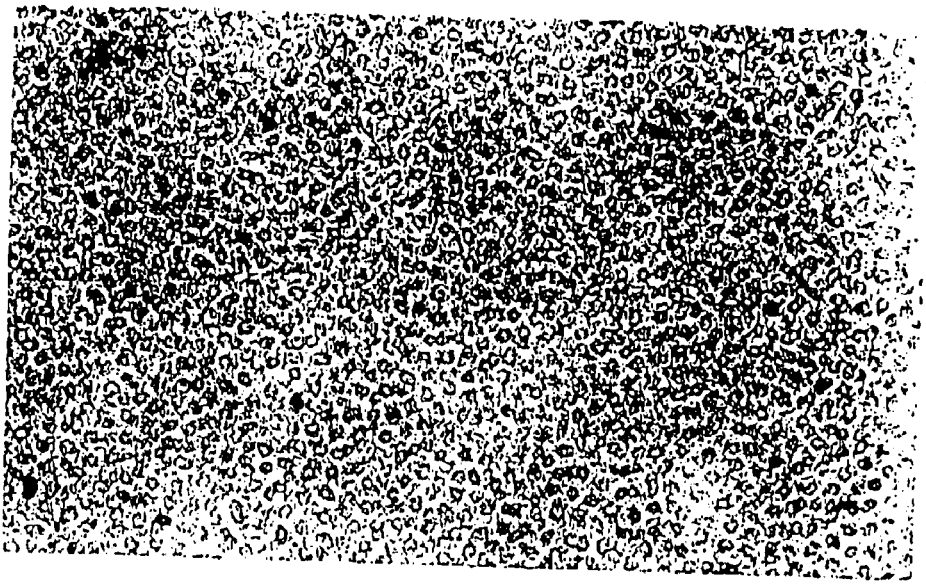
FIG. 1 is a transmission electron microscopic (TEM) micrograph of a section of a sheet sample prepared by thermocompression-molding of a block copolymer of the present invention according to Example 1 and is obtained by cutting the sheet in a plane in parallel with the axis of the melt flow direction of the block copolymer in thermocompression molding.

The present invention will be illustrated in detail below.

The block copolymer of the present invention has two or more polymer blocks A miscible with each other and at least one (meth)acrylic ester polymer block immiscible with the polymer blocks A.

The terms "miscible" and "immiscible" in polymer blocks of the block copolymer of the present invention mean the followings.

Taking a block copolymer having a polymer block X and a polymer block Y as an example, the polymer block X and the polymer block Y are "miscible" with each other when they are mixed or blended and constitute the same domain in observation of a microphase structure (micro dispersion) of a melt-blended material of the block copolymer (i.e., an aggregate of a multitude of molecules of the block copolymer). In contrast, the polymer block X and the polymer block Y are "immiscible" with each other when they are not blended and constitute different domains, respectively.

Whether or not optional two polymer blocks contained in a block copolymer are miscible with each other can be determined by a glass transition temperature of the block copolymer measured by a differential scanning calorimeter (DSC) or a Tα (α dispersion temperature) as a peak temperature of a loss tangent (tan δ) as measured by dynamic viscoelasticity measurement.

When optional two polymer blocks in the block copolymer have substantially the same glass transition temperature or Tα, they are miscible with each other. When the two polymer blocks have different glass transition temperatures or Tαs, they are immiscible with each other.

Whether or not two polymer blocks contained in a block copolymer are miscible with each other can also be determined by electron microscopic observation of a microphase dispersion of the block copolymer to determine whether two polymer blocks constitute the same and one domain or constitute different domains.

Among these determination processes, determination of a glass transition temperature using a DSC (differential scanning calorimeter) or determination of Tα based on dynamic viscoelasticity measurement is preferably employed, since these processes can more precisely determine whether or not polymer blocks in a block copolymer are miscible with each other (the presence or absence of phase separation).

In the block copolymer of the present invention, two or more polymer blocks A miscible with each other may have the same molecular structure with each other (i.e., polymer blocks comprises a homopolymer or copolymer having substantially the same type of monomer(s), same proportions same monomer sequence of plural monomers, if any). Alternatively, they may have different molecular structures (polymer blocks comprising homopolymers or copolymers having different types, amounts, and/or sequence of monomer(s)), as long as the two or more polymer blocks A are miscible.

In general, when two or more polymer blocks A have the same molecular structure with each other, they are miscible with each other. However, some combinations of polymer blocks having different molecular structures are miscible with each other.

Known combinations of such polymer blocks having different molecular structures but being miscible with each other are described in, for example, "POLYMER HANDBOOK" FOURTH EDITION (JOHN WILEY & SONS, INC.) VI/409–482.

Polymers for constituting the polymer blocks A in the block copolymer of the present invention include, but are not limited to, polystyrenes, poly(α-methylstyrene), and other aromatic vinyl compound polymers; polybutadienes, polyisoprenes, polymyrcenes, poly(1,3-dimethylbutadiene), and other conjugated diene polymers and hydrogenated products thereof; polycaprolactones, and other lactone polymers; polydimethylsiloxanes, and other alkylsiloxane polymers; polyethylene glycol, polypropylene glycol, polytetramethylene glycol, and other alkylene oxide polymers; poly(2-vinylpyridine), and other vinylpyridine polymers; acrylic ester polymers, and hydrolyzed products thereof, comprising one or more acrylic esters such as methyl acrylate, ethyl acrylate, propyl acrylate, isopropyl acrylate, n-butyl acrylate, t-butyl acrylate, cyclohexyl acrylate, 2-ethylhexyl acrylate, isobornyl acrylate, lauryl acrylate, dodecyl acrylate, trimethoxysilylpropyl acrylate, N,N-diethylaminoethyl acrylate, and 2-methoxyethyl acrylate; methacrylic ester polymers, and hydrolyzed products thereof, comprising one or more methacrylic esters such as methyl methacrylate, ethyl methacrylate, propyl methacrylate, isopropyl methacrylate, n-butyl methacrylate, t-butyl methacrylate, cyclohexyl methacrylate, 2-ethylhexyl methacrylate, isobornyl methacrylate, lauryl methacrylate, dodecyl methacrylate, trimethoxysilylpropyl methacrylate, N,N-diethylaminoethyl methacrylate, and 2-methoxyethyl methacrylate; acrylamide compound polymers each comprising an acrylamide compound such as N,N-diethylacrylamide; methacrylamide compound polymers each comprising a methacrylamide compound such as N,N-diethylmethacrylamide; unsaturated aldehyde polymers each comprising an unsaturated aldehyde such as methacrolein and acrolein; unsaturated nitrile polymers each comprising an unsaturated nitrile such as methacrylonitrile and acrylonitrile; and other polymers (homopolymers and copolymers).

By forming all the two or more polymer blocks A constituting the block copolymer of the present invention from the one and same polymer selected among the aforementioned polymers, the two or more polymer blocks A become miscible with each other.

Alternatively, one of the two or more polymer blocks A constituting the block copolymer of the present invention may be a polystyrene block and the other may be a poly(α-methylstyrene) block, for example. In this case, the types of polymers constituting the two or more polymer blocks A are different but the polystyrene block and the poly(α-methylstyrene) block are miscible with each other.

Among these configurations, it is preferred in the present invention to form two or more polymer blocks A from acrylic ester or methacrylic ester polymer blocks miscible with each other, and more preferably from polymer blocks comprising methyl methacrylate, methyl acrylate, and/or ethyl acrylate. The resulting block copolymer has further satisfactory weather resistance and thermal stability.

The polymer block B in the block copolymer of the present invention is an acrylic ester or methacrylic ester polymer block immiscible with the polymer blocks A. Monomers for constituting the polymer block B can be selected from a variety of monomers, as long as the resulting polymer block B formed from the monomer(s) mainly comprises at least one monomer selected from acrylic esters and methacrylic esters and is immiscible with the polymer blocks A.

Such acrylic esters for constituting the polymer block B include, but are not limited to, methyl acrylate, ethyl acrylate, propyl acrylate, isopropyl acrylate, n-butyl acrylate, cyclohexyl acrylate, 2-ethylhexyl acrylate, isobornyl acrylate, lauryl acrylate, dodecyl acrylate, trimethoxysilylpropyl acrylate, N,N-diethylaminoethyl acrylate, and 2-methoxyethyl acrylate.

Methacrylic esters for constituting the polymer block B include, but are not limited to, methyl methacrylate, ethyl methacrylate, propyl methacrylate, isopropyl methacrylate, n-butyl methacrylate, t-butyl methacrylate, cyclohexyl methacrylate, 2-ethylhexyl methacrylate, isobornyl methacrylate, lauryl methacrylate, dodecyl methacrylate, trimethoxysilylpropyl methacrylate, N,N-diethylaminoethyl methacrylate, and 2-methoxyethyl methacrylate.

The polymer block B can be formed from one or more of the acrylic esters and/or methacrylic esters.

The polymer block B may further comprise a small amount of a structural unit derived from another monomer in addition to structural unit(s) derived from the acrylic ester and/or methacrylic ester. In this case, examples of the other monomer are butadiene, isoprene, styrene, α-methylstyrene, 2-vinylpyridine, methacrylonitrile, acrylonitrile, methacrolein, acrolein, and other anionically polymerizable monomers. The polymer block B may also further comprise structural units or salts thereof formed by hydrolyzing a polymerized product derived from the acrylic ester and/or methacrylic ester as long as they are in small amounts. Such structural units include, for example, acrylic acid unit, sodium acrylate unit, methacrylic acid unit, and sodium methacrylate unit.

The glass transition temperatures of the polymer blocks A and the polymer block B in the block copolymer of the present invention are not specifically limited. To ensure the block copolymer to exhibit properties as a thermoplastic elastomer or soft resin material effectively, it is preferred that a segment derived from a homogenous mixture of the polymer blocks A has a glass transition temperature above 25° C., and the polymer block B has a glass transition temperature of lower than or equal to 25° C.

Such polymer blocks A to constitute a segment having a glass transition temperature above 25° C. can be appropriately selected from the polymers exemplified as polymers for constituting the polymer blocks A. These polymer blocks A include, but are not limited to, polystyrenes, poly(α-methylstyrene), and other aromatic vinyl compound polymers; poly(2-vinylpyridine), and other vinylpyridine polymers; methacrylic ester polymers, and hydrolyzed products thereof, mainly comprising one or more methacrylic esters such as methyl methacrylate, ethyl methacrylate, propyl methacrylate, isopropyl methacrylate, n-butyl methacrylate, t-butyl methacrylate, cyclohexyl methacrylate, and isobornyl methacrylate; acrylic ester polymers, and hydrolyzed products thereof, mainly comprising one or more acrylic esters such as methyl acrylate, ethyl acrylate, isopropyl acrylate, t-butyl acrylate, cyclohexyl acrylate, isobornyl acrylate, and 2-methoxyethyl acrylate; polymers mainly comprising one or more of compounds such as N,N-diethylacrylamide, N,N-diethylmethacrylamide, methacrolein, acrolein, methacrylonitrile, and acrylonitrile. If a polymer block A having a glass transition temperature of lower than or equal to 25° C. is used among these polymer blocks A, the resulting segment formed by the polymer blocks A can have a glass transition temperature above 25° C. by using a polymer block A having a glass transition temperature above 25° C. as another miscible polymer block A in addition to the aforementioned polymer block A having a glass transition temperature lower than or equal to 25° C. Particularly, the polymer blocks A are formed preferably from aromatic vinyl compound polymers, methacrylic ester polymers, and/or acrylic ester polymers, more preferably from methacrylic ester polymers or acrylic ester polymers, and typically preferably from polymers of methyl methacrylate, methyl acrylate, and/or ethyl acrylate. The resulting block copolymer can have specifically satisfactory weather resistance and thermal stability.

A polymer block B having a glass transition temperature lower than or equal to 25° C. can be formed from an appropriate polymer selected from the polymers for constituting the polymer block B. The polymer block B can have a glass transition temperature lower than or equal to 25° C. by forming the same from a polymer such as acrylic ester polymers mainly comprising one or more of acrylic esters such as methyl acrylate, ethyl acrylate, propyl acrylate, isopropyl acrylate, n-butyl acrylate, 2-ethylhexyl acrylate, lauryl acrylate, dodecyl acrylate, and 2-methoxyethyl acrylate; and methacrylic ester polymers mainly comprising one or more methacrylic esters such as 2-ethylhexyl methacrylate, lauryl methacrylate, dodecyl methacrylate, and 2-methoxyethyl methacrylate. Among them, the polymer block B preferably comprises an acrylic ester or methacrylic ester polymer mainly comprising one or more of: acrylic esters such as n-butyl acrylate, 2-ethylhexyl acrylate, lauryl acrylate, dodecyl acrylate, and 2-methoxyethyl acrylate; and methacrylic esters such as 2-ethylhexyl methacrylate, lauryl methacrylate, and dodecyl methacrylate. More preferably, the polymer block B comprises an acrylic ester polymer mainly comprising one or more acrylic esters such as n-butyl acrylate and 2-ethylhexyl acrylate. The resulting block copolymer can have further satisfactory weather resistance and flexibility.

To ensure the block copolymer of the present invention to have more satisfactory weather resistance, flexibility, thermal resistance, and other properties, it is preferred that the two or more polymer blocks A comprise methacrylic ester polymers each having a glass transition temperature above 25° C. (more preferably a poly(methyl methacrylate)) and the polymer block B comprises the acrylic ester polymer having a glass transition temperature lower than or equal to 25° C. (more preferably an acrylic ester polymer mainly comprising one or more acrylic esters such as n-butyl acrylate and 2-ethylhexyl acrylate).

When at least one of the two polymer blocks A in the block copolymer of the present invention comprises an acrylic ester polymer (specifically poly(methyl acrylate) or poly(ethyl acrylate)), the resulting block copolymer has further satisfactory adhesive properties. In addition, it takes a shorter time to polymerize materials in the production of this type of block copolymer, since the rate of anionic polymerization of acrylates is much faster than that of methacrylate.

The glass transition temperatures of the polymer blocks A and the polymer block B in the present invention are glass transition temperatures determined by analyzing the block copolymer using a differential scanning calorimeter (DSC).

In the block copolymer of the present invention, it is important that a ratio [Mn($A_{max}$)/Mn($A_{min}$)] is set at 2 or more, wherein the ratio [Mn($A_{max}$)/Mn($A_{min}$)] is the ratio of the largest number average molecular weight [Mn($A_{max}$)] to the smallest number average molecular weight [Mn($A_{min}$)] among the two or more polymer blocks A.

By setting the ratio Mn($A_{max}$)/Mn($A_{min}$) at 2 or more, the contents of the polymer block $A_{max}$ and the polymer block $A_{min}$ constituting a hard segment in the block copolymer can be increased to thereby impart high strength and high cohesion to the block copolymer while keeping satisfactory melt fluidity and flexibility. In addition, molded articles and pressure-sensitive adhesive products made from the block copolymer can have reduced anisotropy.

The ratio $Mn(A_{max})/Mn(A_{min})$ is preferably 3 or more to effectively reduce anisotropy in a molded article prepared from the block copolymer of the present invention.

By setting the ratio $Mn(A_{max})/Mn(A_{min})$ at 2 or more when all of the two or more polymer blocks A miscible with each other in the block copolymer of the present invention are methacrylic ester polymers, the polymer blocks A constitute a sphere microphase separation structure with the polymer block B in a melt-blended material (an aggregate of block copolymer molecules prepared by melt-kneading) of the block copolymer.

In melt-blended materials of conventional block copolymers having a ratio $Mn(A_{max})/Mn(A_{min})$ of around 1 and not satisfying the requirements in the present invention, polymer blocks A generally constitute a cylindrical (columnar or rod-like) microphase separation structure or a lamellar microphase separation structure.

The operation of the structure of the block copolymer of the present invention is speculated as follows, although it has not been fully clarified. In the block copolymer of the present invention, the polymer blocks A specifically constitute a sphere microphase separation structure during melt molding and are then solidified while maintaining their sphere microphase separation structure without directional properties even under application of an external force such as shearing force during molding and processing. The resulting molded article has decreased differences in mechanical properties between the melt flow direction and another direction of the block copolymer in melt-molding and has more reduced anisotropy than molded articles formed from conventional equivalents.

The number average molecular weight of the polymer block $A_{min}$ is preferably within a range from 1000 to 15000 to exhibit the above advantages further effectively and to more satisfactorily reduce anisotropy in the block copolymer and molded articles formed therefrom.

When all of the two or more polymer blocks A miscible with each other are methyl methacrylate polymers, the number average molecular weight of the polymer block $A_{min}$ is more preferably within a range from 3000 to 7000. Thus, the resulting block copolymer can have highly reduced surface stickiness and highly reduced anisotropy concurrently.

When the polymer block $A_{max}$ comprises a methacrylic ester polymer and the polymer block $A_{min}$ comprises an acrylic ester polymer among the two or more polymer blocks A miscible with each other in the block copolymer of the present invention, it is not desirable that the ratio $Mn(A_{max})/Mn(A_{min})$ is less than 2 from the viewpoint of the glass transition temperature of the hard segment formed from a homogenous mixture of the polymer block $A_{max}$ and the polymer block $A_{min}$. The range of operating temperatures of molded article prepared from the resulting block copolymer may go down.

The upper limit of the ratio $Mn(A_{max})/Mn(A_{min})$ is not specifically limited. However, the ratio $Mn(A_{max})/Mn(A_{min})$ is preferably less than or equal to 30 and more preferably less than or equal to 20 to reduce surface stickiness in molded articles and to impart a sufficient molecular weight to the polymer block $A_{min}$ to constitute a hard segment.

The number average molecular weights of the polymer blocks A and the polymer block B are not specifically limited. In general, those of the polymer blocks A preferably range from 1000 to 50000 and that of the polymer block B preferably ranges from 5000 to 500000 for further satisfactory mechanical properties, moldability and thermal resistance of the block copolymer. Among the polymer blocks A, the polymer block $A_{min}$ preferably has a number average molecular weight ranging from 1000 to 15000 to further highly reduce both surface stickiness and anisotropy in the block copolymer and molded articles prepared therefrom.

The number average molecular weight of the entire block copolymer of the present invention is not specifically limited, can be appropriately selected depending on the application and requirements and is preferably within a range from 8000 to 700000. For example, when a molded article is prepared by melt molding using the block copolymer of the present invention, the number average molecular weight of the block copolymer is preferably equal to or more than 10000. If the number average molecular weight of the block copolymer is excessively high, the resulting block copolymer may have decreased melt moldability. Accordingly, it is preferably less than or equal to 500000 to ensure the block copolymer to exhibit appropriate melt fluidity for melt molding.

Each of the number average molecular weights of the polymer blocks A and the polymer block B in the block copolymer of the present invention can be determined as the product of the number average molecular weight of the entire block copolymer and the mass fraction of the polymer block in question. The number average molecular weight of the entire block copolymer of the present invention can be determined by, for example, gel permeation chromatography (GPC) and other analysis means.

The mass fractions of the polymer blocks A and the polymer block B can be determined according to an analysis means such as NMR. If they cannot be determined by the analysis of the block copolymer of the present invention alone, they may be determined regarding to analyses on polymers formed in the course of the production of the block copolymer.

The molecular weight of each block in the block copolymer can be determined, for example, based on the number average molecular weight of the polymer before block copolymerization and a ratio. Such ratios include, for example, a compositional ratio of the resulting block copolymer determined from the amount of material monomers, reaction rate and by an analysis means such as NMR; and a block efficiency (content in the block copolymer) before and after block copolymerization determined from a peak ratio in GPC or by liquid chromatography (LC).

For example, a triblock copolymer comprising polystyrene and/or poly(methyl methacrylate) as the polymer blocks A and being represented by a formula: $A_{max}$—B—$A_{min}$ is obtained by sequentially polymerizing individual polymer blocks from $A_{max}$, wherein $A_{max}$ is the polymer block $A_{max}$ having the larger number average molecular weight among the two polymer blocks A; $A_{min}$ is the polymer block $A_{min}$ having the smaller number average molecular weight among the two polymer blocks A; and B is the polymer block B. In this case, the $Mn(A_{min})$ of the polymer block $A_{min}$ can be determined according to an equation: $Mn(A_{min})=Mn(A_{max}) \times X/f$, wherein $Mn(A_{max})$ is the number average molecular weight of a $A_{max}$ homopolymer determined by GPC; X is the mass ratio of the polymer block $A_{min}$ into the polymer block $A_{max}$ determined by NMR analysis of the triblock copolymer; and f is the molar content of the triblock copolymer determined by LC.

The block copolymer of the present invention must include at lest one block bonding represented by following Formula (I):

$$(—)A_{max}—B—A_{min}(—) \qquad (I)$$

wherein $A_{max}$ is the polymer block $A_{max}$ having the largest number average molecular weight among the polymer blocks A; $A_{min}$ is the polymer block $A_{min}$ having the smallest number average molecular weight among the polymer blocks A; B is the polymer block B; "—" is a chemical bond connecting between polymer blocks; and (—) means that a chemical bond is present or not.

In Formula (I), $A_{max}$ and $A_{min}$ are illustrated on the left side and on the right side of B, respectively, for the sake of convenience. The lateral positional relationship between $A_{max}$ and $A_{min}$ with respect to B is not specifically limited. Block bonding structure in which $A_{max}$ is bonded to the right side of B and $A_{min}$ is bonded to the left side of B are also included in the block bonding represented by Formula (I).

If all the polymer block B is not present between the polymer block $A_{max}$ and the polymer block $A_{min}$, namely if a block copolymer has no block bonding represented by Formula (I), the resulting block copolymer and molded articles prepared therefrom lose elastomeric properties and cannot have reduced anisotropy.

The block copolymer of the present invention must have a total content of the polymer blocks A ranging from 20 wt % to 45 wt % based on the total weight of the block copolymer. If the content of the polymer is less than 20% by mass, the block copolymer, molded articles and other products obtained therefrom have deteriorated handleability. If it exceeds 45 wt %, the block copolymer has insufficient flexibility. The content of the polymer is preferably within a range from 25 wt % to 40 wt % for further satisfactory handleability and flexibility of the block copolymer, molded articles and pressure-sensitive adhesive compositions obtained therefrom.

The sequence of the polymer and the polymer block B and the numbers of individual polymer blocks in the block copolymer of the present invention are not specifically limited, as long as the block copolymer intramolecularly has at least one block bonding represented by Formula (I), in which the polymer block B is combined between the polymer block $A_{max}$ and the polymer block $A_{min}$. The block copolymer of the present invention can be any of, for example, a triblock copolymer having a polymer block B and two polymer combined at both ends of the polymer block B; a tetrablock copolymer having two polymer and two polymer blocks B combined; and a block copolymer having five or more in total of polymer and polymer blocks B.

Individual polymer blocks in the block copolymer of the present invention may be combined with one another in any form such as linear form, polybranched form, and star form.

To exhibit properties as a thermoplastic elastomer or soft resin material further effectively, the block copolymer of the present invention is preferably a triblock copolymer having a block sequence represented by following Formula (II):

$$A_{max}—B—A_{min} \qquad (II)$$

wherein $A_{max}$ is the polymer block $A_{max}$ having the largest number average molecular weight (i.e., having the higher number-average molecular weight) between the polymer blocks A; $A_{min}$ is the polymer block $A_{min}$ having the smallest number average molecular weight (i.e., having the lower number-average molecular weight) between the polymer blocks A; B is the polymer block B; and "—" is a chemical bond connecting between polymer blocks.

In Formula (II), $A_{max}$ and $A_{min}$ are illustrated on the left side and on the right side of B, respectively, for the sake of convenience. The lateral positional relationship between $A_{max}$ and $A_{min}$ with respect to B is not specifically limited. Triblock copolymers in which $A_{max}$ is bonded to the right side of B and $A_{min}$ is bonded to the left side of B are also included in the triblock copolymers represented by Formula (II).

Among the triblock copolymers represented by Formula (II), typically preferred triblock copolymers for use in the production of molded articles are those in which $A_{max}$ and $A_{min}$ comprise methacrylic ester polymer blocks miscible with each other and B comprises an acrylic ester polymer block immiscible with $A_{max}$ and $A_{min}$. These triblock copolymers have further excellent melt fluidity, flexibility, and elastomeric properties, reduced surface stickiness, reduced anisotropy, and higher dimensional accuracy.

Among the triblock copolymers represented by Formula (II), typically preferred triblock copolymers for use as polymer materials for pressure-sensitive adhesive compositions are those in which $A_{max}$ comprises a methacrylic ester polymer block, specifically a poly(methyl methacrylate) block, $A_{min}$ comprises an acrylic ester polymer block miscible with $A_{max}$, and B comprises an acrylic ester polymer block immiscible with $A_{max}$ and $A_{min}$. These triblock copolymers are further excellent in melt fluidity, flexibility, elastomeric properties, and adhesive properties.

The block copolymer of the present invention can be industrially advantageously prepared, for example, by anionic polymerization using an organic alkali metal compound and/or an organic alkaline earth metal compound as a polymerization initiator.

The anionic polymerization for the preparation of the block copolymer of the present invention can be basically performed according to a known anionic polymerization procedure for the preparation of (meth)acrylic block copolymers, such as processes described in aforementioned Japanese Examined Patent Application Publication No. 25859 of 1995 and Japanese Unexamined Patent Application Publication No. 335432 of 1999.

Such organic alkali metal compounds for use as the polymerization initiator are organometallic compounds of alkali metals such as lithium, sodium, potassium, rubidium, cesium, and francium. The organic alkaline earth metal compounds are organometallic compounds of alkaline earth metals such as beryllium, magnesium, calcium, strontium, barium, and radium. Examples of the organic alkali metal compounds for use as the polymerization initiator in the present invention are n-butyllithium, sec-butyllithium, tert-butyllithium, 1,1-diphenylhexyllithium, diphenylmethyllithium, 1,1-diphenyl-3-methylpentyllithium, fluorenyllithium, triphenylmethyllithium, α-lithiumethyl isobutyrate, oligostyryllithium, polystyryllithium, oligo-α-methylstyryllithium, poly-α-methylstyryllithium, oligobutadienyllithium, polybutadienyllithium, oligoisoprenyllithium, polyisoprenyllithium, and other monovalent organic lithium compounds; diphenylmethylpotassium, triphenylmethylpotassium, and other monovalent organic potassium compounds; diphenylmethylsodium, triphenylmethylsodium, and other monovalent organic sodium compounds. Examples of the organic alkaline earth metal compounds for use as the polymerization initiator in the present invention are phenylmagnesium bromide, phenylmagnesium chloride, t-butylmagnesium bromide, t-butylmagnesium chloride, and other monovalent organic magnesium compounds.

One or more of the organic alkali metal compounds and organic alkaline earth metal compounds can be used in the present invention. Among them, organic alkali metal compounds are preferred, of which monovalent organic lithium compounds are typically preferred.

The amount of the polymerization initiator comprising such an organic alkali metal compound and/or organic alkaline earth metal compound can be appropriately set depending on the molecular weight of the target block copolymer and other conditions and is generally preferably from 0.002 to 20 moles, and more preferably from 0.005 to 5 moles relative to 100 moles of the total monomers used.

The anionic polymerization is preferably performed under highly living conditions to thereby yield the block copolymer of the present invention using the organic alkali metal compound and/or organic alkaline earth metal compound. By this procedure, a propagation end of a polymer block can be prevented from deactivation during its formation of each polymer block. Such a propagation end can be used in a subsequent polymerization of another polymer block without deactivation, and the number average molecular weight of the polymer block in question can be easily controlled at a set level. In addition, the target block copolymer can be produced with good reproducibility while preventing formation (contamination) of by-products.

To perform highly living anionic polymerization, it is preferred to supply an additive or co-catalyst to a polymerization reaction system, to appropriately select temperature conditions in the polymerization, and to prevent water and other impurities from contaminating there action system at early stages of and during polymerization.

Such additives and co-catalyst for performing highly living anionic polymerization can be appropriately selected from among, for example, Lewis acids, Lewis bases, inorganic salts, and organic salts.

Such Lewis acids include, but are not limited to, triethylaluminum, tri-n-butylaluminum, triisobutylaluminum, and other trialkylaluminum compounds; diisobutyl(2,6-di-t-butyl-4-methylphenoxy)aluminum, and other monoaryloxydialkylaluminum compounds; methylbis(2,6-di-t-butylphenoxy)aluminum, ethylbis(2,6-di-t-butylphenoxy)aluminum, isobutylbis(2,6-di-t-butylphenoxy)aluminum, hexylbis(2,6-di-t-butylphenoxy)aluminum, methylbis(2,6-di-t-4-methylphenoxy)aluminum, ethylbis(2,6-di-t-4-methylphenoxy)aluminum, isobutylbis(2,6-di-t-4-methylphenoxy)aluminum, hexylbis(2,6-di-t-4-methylphenoxy)aluminum, isobutyl[2,2'-methylenebis(6-t-butylphenoxy)]aluminum, isobutyl[2,2'-methylenebis(6-t-butyl-4-methylphenoxy)]aluminum, and other bis(aryloxy) monoalkylaluminum compounds; triethylborane, triphenylborane, and other organic boron compounds; dimethylzinc, diethylzinc, and other organic zinc compounds; tetraisopropoxytitanium, tetrabutoxytitanium, and other organic titanium compounds.

The Lewis bases include, but are not limited to, diethyl ether, anisole, dimethoxyethane, diethoxyethane, tetrahydrofuran, 12-crown-4, and other ether compounds; triethylamine, N,N,N',N'-tetramethylethylenediamine, N,N,N',N",N"-pentamethyldiethylenetriamine, tris(2-dimethylaminoethyl)amine, sparteine, and other tertiary amine compounds.

Examples of the inorganic salts are lithium chloride and cesium fluoride.

Examples of the organic salts are tetramethylammonium chloride, tetramethylammonium bromide, tetraethylammonium chloride, tetraethylammonium bromide, tetraphenylphosphonium chloride, tetraphenylphosphonium chloride, and other organic quaternary salts; lithium isopropoxide, potassium t-butoxide, lithium methoxyethoxide, lithium methoxyethoxyethoxide, and other alkoxides.

The amount of the additive or co-catalyst to perform highly living anionic polymerization is not specifically limited and is generally preferably from 10 to 10000 moles relative to 100 moles of the polymerization initiator.

The block copolymer of the present invention can be prepared by any process as long as it is an anionic polymerization process. The block copolymer is preferably prepared by anionic polymerization using the organic alkali metal compound and/or organic alkaline earth metal compound as the polymerization initiator.

In anionic polymerization, specifically in highly living anionic polymerization, most of used monomers are consumed for the formation of target polymer blocks, and the amounts of the monomers significantly affect the number average molecular weights of the individual polymer blocks. Accordingly, the block copolymer of the present invention is preferably prepared according to the following process.

Preferred Production Process of Block Copolymers of the Present Invention

The preferred process for producing the block copolymer of the present invention is a process comprising:

(i) performing anionic polymerization using an organic alkali metal compound and/or an organic alkaline earth metal compound as a polymerization initiator to thereby yield the block copolymer of the present invention;

(ii) controlling a ratio ($W_{max}/W_{min}$) at 2 or more in the production of the block copolymer, wherein the ratio ($W_{max}/W_{min}$) is the ratio of the mass ($W_{max}$) of a monomer used for forming a polymer block $A_{max}$ to the mass ($W_{min}$) of a monomer used for forming a polymer block $A_{min}$ to yield polymer blocks as the two or more polymer constituting the block copolymer and being miscible with each other to thereby ensure the resulting block copolymer to have a ratio [$Mn(A_{max})/Mn(A_{min})$] of 2 or more, wherein the ratio [$Mn(A_{max})/Mn(A_{min})$] is the ratio of the number average molecular weight [$Mn(A_{max})$] of the polymer block $A_{max}$ having the largest number average molecular weight among the polymer to the number average molecular weight [$Mn(A_{min})$] of the polymer block $A_{min}$ having the smallest number average molecular weight among the polymer blocks A; and (iii) controlling the total amount of monomers for forming the polymer blocks A within a range from 20 wt % to 45 wt % based on the total amount of monomers for forming the block copolymer.

To produce the triblock copolymer represented by Formula (II) (i.e., the polymer block $A_{max}$— the polymer block B— the polymer block $A_{min}$) according to the process, the process is preferably a process comprising:

(i) performing anionic polymerization using an organic alkali metal compound and/or an organic alkaline earth metal compound as a polymerization initiator to thereby yield the block copolymer of the present invention;

(ii) controlling a ratio ($W_{max}/W_{min}$) at 2 or more in the production of the block copolymer, wherein the ratio ($W_{max}/W_{min}$) is the ratio of the mass ($W_{max}$) of a monomer used for forming a polymer block $A_{max}$ to the mass ($W_{min}$) of a monomer used for forming a polymer block $A_{min}$; and (iii) controlling the total amount of monomers for forming the polymer block $A_{max}$ and the polymer block $A_{min}$ within a range from 20 wt % to 45 wt % based on the total amount of monomers for forming the block copolymer.

In the production of the block copolymers of the present invention, monomers for use in the formation of the two or more polymer blocks A must be selected from among combinations of monomers that can form polymers miscible with each other (the two or more polymer blocks A). Likewise, monomers for the formation of the polymer blocks A and the (meth)acrylic ester monomer for the formation of the polymer block B must be selected from among combinations of monomers that can form the polymer block B and the polymer blocks A immiscible with each other.

The block copolymer of the present invention can be prepared by sequential polymerizations for the formation of the polymer and for the formation of the polymer block B. The block copolymer of the present invention may be prepared by allowing a coupling agent (a polyfunctional polymerization terminator or a polyfunctional monomer) to react with a reaction product after the sequential formation of the polymer blocks.

The polymer blocks are sequentially prepared by subjecting monomers for the formation of a polymer block A (or a polymer block B) to polymerization in a polymerization system in the presence of a polymerization initiator comprising an organic alkali metal compound and/or organic alkaline earth metal compound to thereby form the polymer block A (or polymer block B) having an anionic moiety at its end; supplying monomers for the formation of the polymer block B (or polymer block A) to the polymerization system and continuing polymerization with the anionic moiety at the end as a starting point to thereby form the polymer block B (or polymer block A); and repeating the above polymerization procedure depending on the type (e.g., the number of bonding of each polymer block) of the target block copolymer.

Typical procedures of the process for producing the block copolymer of the present invention include, but are not limited to the followings.

For example, a triblock copolymer comprising the polymer block $A_{max}$-polymer block B-polymer block $A_{min}$ can be produced by anionic polymerization in the presence of a polymerization initiator comprising an organic alkali metal compound and/or organic alkaline earth metal compound, by sequentially performing a step for forming the polymer block $A_{max}$, a step for forming the polymer block B, and a step for forming the $A_{min}$ in this order.

Likewise, a triblock copolymer comprising the polymer block $A_{min}$-polymer block B-polymer block $A_{max}$ can be prepared by following the above steps in reverse, namely, by performing the step for forming the polymer block $A_{min}$, the step for forming the polymer block B, and the step for forming the polymer block $A_{max}$ in this order.

A block copolymer comprising a polymer block $A_{max}$-polymer block B-coupling agent-polymer block B-polymer block $A_{min}$ can be produced by performing anionic polymerization in the presence of a polymerization initiator comprising an organic alkali metal compound and/or organic alkaline earth metal compound to thereby yield a polymer block $A_{max}$ having an anionic moiety at its end; separately performing anionic polymerization in the same manner as above to thereby yield a polymer block $A_{min}$ having an anionic moiety at its end; mixing the polymer block $A_{max}$ having an anionic moiety at its end and the polymer block $A_{min}$ having an anionic moiety at its end to yield a mixture; supplying monomer(s) for the formation of a polymer block B to the mixture and performing polymerization to thereby yield a mixture of a diblock copolymer comprising the polymer block B having an anionic moiety at its end-polymer block $A_{max}$ and a diblock copolymer comprising the polymer block B having an anionic moiety at its end-polymer block $A_{min}$; and allowing the mixture to react with a divalent coupling agent. The bonding structure comprising the polymer block B-coupling agent-polymer block B in the resulting block copolymer integrally plays a role as a polymer block B. This process ultimately yields a triblock copolymer comprising the polymer block $A_{max}$-polymer block B-polymer block $A_{min}$.

The process concurrently yields a block copolymer comprising polymer block $A_{max}$-polymer block B-polymer block $A_{min}$ and a block copolymer comprising polymer block $A_{min}$-polymer block B-polymer block $A_{max}$ and thereby requires an operation for separating and purifying these block copolymers after polymerization. The block copolymer of the present invention can be produced using this technique.

The relative ratio of the number average molecular weight of the polymer block $A_{max}$ to that of the polymer block $A_{min}$ can be controlled by intentionally deactivating a set proportion of the end anionic moiety of the polymer having an anionic moiety at its end formed in the course of the anionic polymerization procedure. This process yields by-products and requires a separation and purification procedure for the removal of the by-products after polymerization. The block copolymer of the present invention can also be produced using this technique.

Anionic polymerization procedures for producing the block copolymer of the present invention are not specifically limited and include, for example, solution polymerization, bulk polymerization, and precipitation polymerization. Among these procedures, solution polymerization in an atmosphere of an inert gas is preferably employed for further highly living polymerization. Such inert gas for use herein include, for example, nitrogen gas and argon gas. The inert gas is preferably dried before use.

A solvent for use in solution polymerization can be appropriately selected according to the types of used monomers and other conditions. For example, when an acrylic ester and/or methacrylic ester is used as the monomer, examples of preferred solvents for better results are benzene, toluene, xylene, and other aromatic hydrocarbon compounds; n-hexane, n-heptane, cyclohexane, methylcyclohexane, and other saturated hydrocarbon compounds; diethyl ether, 1,4-dioxane, 1,2-dimethoxyethane, diethylene glycol dimethyl ether, anisole, diphenyl ether, tetrahydrofuran, and other ether compounds.

The amount of the solvent is not specifically limited and is preferably from 1 to 100 times the total weight of monomers used for the formation of the polymer block A or polymer block B and monomers already present in the polymerization system.

A polymerization temperature can be appropriately selected in consideration of the type(s) of monomer(s) used for polymerization, intended living properties, polymerization rate, and other conditions. For example, the polymerization temperature preferably ranges from −100° C. to 30° C. for the better results in the polymerization of an acrylic ester. The polymerization temperature preferably ranges from −80° C. to 50° C. for the better results in the polymerization of a methacrylic ester.

After the completion of all procedures for the formation of the target polymer blocks, a terminator is added to the polymerization system according to a conventional anionic polymerization procedure to thereby complete the polymerization reaction. The terminator is not specifically limited and includes, for example, methanol, acetic acid, hydrochloric acid, and other monovalent protic compounds.

Alternatively, after the completion of all procedures for the formation of the target polymer blocks, a coupling agent comprising a polyfunctional polymerization stopper or a polyfunctional monomer can be allowed to react according to a conventional anionic polymerization procedure.

When a polyfunctional terminator is used as the coupling agent, there is no need of using the aforementioned terminator.

When a polyfunctional monomer is used as the coupling agent, the terminator is allowed to react after a coupling reaction to thereby stop the reaction.

Such polyfunctional terminator that can be used as the coupling agent are not specifically limited and include, for example, $\alpha,\alpha'$-dibromo-p-xylene, and other divalent halogenated alkyl group-containing compounds; isophthalaldehyde, and other divalent aldehyde compounds; isophthaloyl chloride, and other divalent carboxyloyl chloride compounds; cyanuric chloride, and other halogen compounds having 3 or higher valency.

The polyfunctional monomers that can be used as the coupling agent are not specifically limited and include, for example, ethylene glycol diacrylate, hexanediol diacrylate, and other bifunctional acrylic esters; ethylene glycol dimethacrylate, hexanediol dimethacrylate, and other bifunctional methacrylic esters; trimethylolpropane triacrylate, and other trifunctional or higher functional acrylic esters.

By using a trivalent or higher polyfunctional terminator or a bifunctional or higher polyfunctional monomer as the coupling agent, a polybranched or star block copolymer can be obtained.

The uses of the block copolymers of the present invention are not specifically limited. The block copolymers of the present invention are thermoplastic, are softened and/or melted by heating and can be subjected to various molding and processing procedures conventionally employed for thermoplastic polymers. As a result, the block copolymers can yield various molded articles, laminated products, and other products. The block copolymers can be molded and processed by any process and are preferably molded by melt molding in which the block copolymers are heated and melted to thereby form a set shape for significantly exhibiting the operation and advantages of the block copolymers of the present invention. A temperature for heating and melting the block copolymers of the present invention can be appropriately set according to the structure and thermal properties of the block copolymers and other conditions and is generally within a range from 100° C. to 300° C. A cooling temperature for molding after melting is generally within a range from about 0° C. to substantially 100° C. Typical procedures of the melt molding include, for example, thermocompression molding, injection molding, extrusion molding, blow molding, film molding such as T-die film molding and inflation molding, melt spinning, and calendering molding.

Such a molding process can produce films, sheets, plates, tubes, fibers, three-dimensional articles, and other molded articles having any other shapes.

The block copolymers of the present invention are also useful in the field of pressure-sensitive adhesives and regular adhesives and can be used as polymer materials for pressure-sensitive adhesive compositions. For example, a pressure-sensitive adhesive composition comprising the block copolymer of the present invention is applied to a base film or tape by solution coating, melt-extrusion coating, or hot melt coating to thereby yield a pressure-sensitive adhesive film. Among these procedures, melt-extrusion coating and hot melt coating are preferably employed for advantageously utilizing a feature, i.e., a low melt viscosity of the block copolymers of the present invention.

Where necessary, fillers, other thermoplastic resins, lubricants, plasticizers, and other additives can be incorporated into the block copolymers of the present invention according to necessity in the production of molded articles, laminated articles, and other products. To produce pressure-sensitive adhesive compositions, appropriate additives such as tackifiers, process oils and other petroleum flexibilizers, stabilizers, other thermoplastic resins generally used in pressure-sensitive adhesive compositions can be added to the block copolymers of the present invention.

EXAMPLES

The present invention will be illustrated in further detail with reference to several examples below, which are not intended to limit the scope of the present invention.

Physical properties of samples in the following examples and comparative examples were determined by the following methods.

(1) Number Average Molecular Weights of Polymers and Block Copolymers:

The number average molecular weight in terms of polystyrene of a sample was determined with a monodisperse polystyrene as a reference based on a differential refractive index (RI) determined by using gel permeation chromatography (HLC-8020 available from Tosoh Corporation; solvent: tetrahydrofuran).

(2) Molecular Weight Distributions of Polymers and Block Copolymers:

The number average molecular weight (Mn) and weight average molecular weight (Mw) of a sample were determined by GPC in the same manner as above, and the ratio (Mw/Mn) of the former to the latter was used as an index of the molecular weight distribution.

(3) Proportions of Individual Polymer Blocks in Block Copolymers:

The proportions of individual polymer blocks in a block copolymer were determined by calculation based on $^1$H-NMR analysis.

(4) Glass Transition Temperatures of Individual Polymer Blocks in Block Copolymers:

The glass transition temperatures of individual polymer blocks in a block copolymer were determined by using a differential scanning calorimeter (DSC) at a heating rate of 10° C. per minute.

(5) Block Efficiency in Polymerization Reaction:

The block efficiency in a polymerization reaction was determined by calculation based on HPLC (high-performance liquid chromatography; solvent: ethyl acetate/cyclohexane) analysis.

(6) Fluidity (Flow) of Block Copolymers:

The melt flow rate (MFR) of a block copolymer was determined according to a method specified in Japanese Industrial Standards (JIS) K-7210 at a temperature of 200° C. under a load of 21.18 N.

(7) Hardness:

A block copolymer was subjected to thermocompression molding at a heating temperature of 200° C. and a pressure of 1.0 MPa and thereby yielded ten plies of a 250-mm square sheet 1 mm thick. A 30-mm square specimen 1 mm thick was cut from the center of each sheet, and a total of ten specimens were laminated (1.0 cm thick). The durometer hardness (type A) of the laminated article was determined according to a method specified in JIS K-6253.

(8) Tackiness:

A block copolymer was subjected to thermocompression molding at a heating temperature of 200° C. and a pressure of 1.0 MPa and thereby yielded a 250-mm square sheet 1 mm thick. A round specimen having a radius of 10 mm was cut from an area in the vicinity of its edge and was subjected to a probe tackiness test according to a method specified in JIS Z-0237. It can be determined that the surface stickiness is reduced with a decreasing tackiness.

(9) Tensile Strength at Break and Tensile Elongation at Break:

A block copolymer was subjected to thermocompression molding at a heating temperature of 200° C. and a pressure of 1.0 MPa and thereby yielded a 250-mm square sheet 1 mm thick. A JIS #3 dumbbell specimen having, as its longitudinal direction, a melt flow direction (a radial direction from the center to the outer periphery of the sheet) in the thermocompression molding was cut from an area in the vicinity of the edge of the sheet. The tensile strength at break and the tensile elongation at break of the dumbbell specimen were determined according to a method specified in JIS K-6251.

(10) Degree of Mechanical Anisotropy (Determination Based on Tensile Modulus of Elasticity):

(i) About 30 g of a granular block copolymer was placed at the center of a mold cavity 150 mm long, 150 mm wide and 1 mm deep in size, was heated at 200° C. under no load for 2 minutes, was subjected to thermocompression molding by heating at 200° C. at a pressure of 1.0 MPa for 3 minutes and cooling to 20° C. while maintaining the same pressure. Thus, a 150-mm square sheet 1 mm thick was produced.

(ii) A JIS #3 dumbbell specimen having, as its longitudinal direction, a melt flow direction (a radial direction from the center to the outer periphery of the sheet) in the thermocompression molding was cut from an area in the vicinity of the edge of the sheet prepared in (i). The tensile modulus of elasticity ($E_L$) (MPa) of the specimen was determined according to a method specified in JIS K-6251.

(iii) A JIS #3 dumbbell specimen having, as its longitudinal direction, a direction perpendicular to the melt flow direction (a radial direction from the center to the outer periphery of the sheet) in the thermocompression molding was cut from an area in the vicinity of the edge of the sheet prepared in the process (i). The tensile modulus of elasticity ($E_T$) (MPa) of the specimen was determined according to a method specified in JIS K-6251.

(iv) The tensile modulus of elasticity ($E_L$) in the melt flow direction determined in the process (ii) and the tensile modulus of elasticity ($E_T$) in a traversal direction to the melt flow direction determined in the process (iii) were compared. A molded article obtained from the block copolymer is evaluated as having decreasing mechanical anisotropy and exhibiting well-balanced mechanical properties in the entire molded article when the two tensile modulus of elasticity are close.

(11) Melt Viscosity of Block Copolymers:

The melt viscosity of a block copolymer was determined using a capillary rheometer Flow Tester CFT-500 available from Shimadzu Corporation under conditions of a plunger sectional area of 1 cm$^2$, a die (nozzle) size of 1 mm in diameter and 10 mm in length, a test load of 10 kg/cm$^2$ and a temperature of 180° C.

(12) Adhesive Strength of Pressure-sensitive Adhesive Tapes:

The adhesive strength of a pressure-sensitive adhesive tape was determined by a 180-degree peeling test according to JIS Z-0237 in the following manner. Specimens each 25 mm wide and 100 mm long were cut from a prepared pressure-sensitive adhesive tape and were attached to a polyethylene sheet about 1 mm thick and a stainless steel (SUS 304) plate, respectively. The specimen was then peeled off in 180 degrees direction at a rate of 30 cm/minute at 25° C.

(13) Holding Power of Pressure-sensitive Adhesive Tapes:

The holding power of a pressure-sensitive adhesive tape was determined according to JIS Z-0237 in the following manner. A pressure-sensitive adhesive tape was prepared and was attached to a stainless steel (SUS 304) plate (attaching area: 25 mm×25 mm). A weight of 1 kg was hanged from the attached specimen at an ambient temperature of 70° C., and the holding power of the pressure-sensitive adhesive tape was determined based on the time (holding time) until the weight dropped. When the weight did not drop off even after 240 minutes test, the holding power was determined based on the slippage of the pressure-sensitive adhesive tape 240 minutes later.

Methyl methacrylate, n-butyl acrylate, and toluene used in the following examples and comparative examples were prepared by dehydrating a commercially available product with calcium hydride distilling, and drying with the use of a molecular sieve. The resulting substances were distilled under reduced pressure immediately before use.

Example 1

(1) In a 200-ml three-neck flask with its inner atmosphere replaced with nitrogen gas, 92 ml of toluene, 4.5 ml of a 0.7 mol/liter solution of isobutylbis(2,6-di-tert-butyl-4-methylphenoxy)aluminum in toluene, and 2.4 g (27 mmol) of 1,2-dimethoxyethane as a polar additive were placed, were stirred and thereby yielded a homogenous solution. The solution was further treated with 0.15 ml (0.20 mmol) of a solution of sec-butyllithium (a cyclohexane solution having a concentration of 1.3 mol/liter).

(2) The solution was further treated with 3.75 g (37.5 mmol) of methyl methacrylate (hereinafter referred to as "MMA") as a first monomer with stirring at 0° C. for 2 hours for polymerization. A part (2 ml) of the solution was then sampled from the polymerization system, was analyzed by $^1$H-NMR and was found that an unreacted MMA was present only in a trace amount and a conversion from MMA was equal to or more than 99%. The sample was poured into 20 ml of methanol, a precipitated polymer (poly(methylmethacrylate)) (hereinafter referred to as "PMMA") was taken out, was dried under reduced pressure, was dissolved in tetrahydrofuran (hereinafter referred to as "THF"), was subjected to gel permeation chromatography (hereinafter referred to as "GPC") and was found that the polymer had a number average molecular weight of 19100 and a molecular weight distribution (Mw/Mn) of 1.05.

(3) After the polymerization of MMA in the process (2), the solution was cooled to −30° C. and was further treated with 15.0 g (117 mmol) of n-butyl acrylate (hereinafter referred to as "n-BA") as a second monomer added over 30 minutes. After the completion of addition, the mixture was further stirred at −30° C. for 10 minutes to thereby complete polymerization. A part (2 ml) of the solution was then sampled from the polymerization system, was analyzed by $^1$H-NMR and was found that an unreacted n-BA was present only in a trace amount and a conversion from n-BA was equal to or more than 99%. The sample was analyzed by GPC in the same manner as above and was found that the polymer had a number average molecular weight of 106300 and a molecular weight distribution (Mw/Mn) of 1.03. In addition, the polymer was analyzed by NMR and was found to contain 19.9 wt % and 80.1 wt % of an MMA unit and an n-BA unit, respectively, and to be a diblock copolymer (PMMA-Pn-BA) comprising one PMMA block and one poly(n-BA) block (hereinafter referred to as "PnBA").

(4) After the polymerization of n-BA in the process (3), the solution was further treated with 1.25 g (12.5 mmol) of MMA as a third monomer added at −30° C. The resulting mixture was stirred, thereby yielded a homogenous solution, was further stirred at −30° C. for further 1 hour, was warmed to 0° C. and was further stirred for 2 hours for polymerization. A part (2 ml) of the solution was then sampled from the polymerization system, was analyzed by $^1$H-NMR and was found that unreacted MMA was presence in a content of 10% and a conversion from MMA was 90%.

(5) The polymerization system was further treated with 10 ml of methanol with stirring at room temperature for 1 hour to thereby deactivate propagation end of the polymer and to terminate polymerization. The whole solution was poured into 2 liters of methanol, a precipitate was recovered, and volatile matters were removed under reduced pressure.

Thus, 19.2 g of a polymer was obtained in a yield of 97%.

(6)
(i) The resulting polymer obtained in the process (5) was analyzed by GPC in the same manner as above and was found to have a number average molecular weight of 112000 and a molecular weight distribution (Mw/Mn) of 1.02. The polymer was further analyzed by high performance liquid chromatography (HPLC) and was found that no trace of PMMA and PMMA-PnBA was observed and that a block efficiency in the series of polymerization reactions was substantially 100%. In addition, analysis of the polymer by NMR revealed that the polymer contains 24.3 wt % and 75.7 wt % of the MMA unit and n-BA unit, respectively.

(ii) These analyses and the analysis of PMMA-PnBA obtained in the process (3) revealed that the resulting polymer is a triblock copolymer (PMMA-PnBA-PMMA) comprising PnBA as an intermediate block and one each PMMA combined at both ends of PnBA and that the mass proportions of the PMMA block at one end, the intermediate PnBA block, and the PMMA block at the other end are 18.8 wt %, 75.7 wt %, and 5.5 wt %, respectively.

(iii) These results show that, in the PMMA blocks at both ends in the resulting triblock copolymer, a smaller number average molecular weight PMMA block has a number average molecular weight $[Mn(A_{min})]$ of $(19100 \times 5.5)/18.8=5600$, and that the ratio $[Mn(A_{max})/Mn(A_{min})]$ of the number average molecular weight $[Mn(A_{max})]$ (19100) of a larger number average molecular weight PMMA block to the number average molecular weight $[Mn(A_{min})]$ of the smaller number average molecular weight PMMA block is $19100/5600=3.41$.

(7) The polymer (triblock copolymer) obtained in the process (5) was analyzed by DSC and was found that both the two PMMA blocks have a glass transition temperature of 112° C. and the PnBA blocks has a glass transition temperature of −48° C. These results show that the two PMMA blocks are miscible with each other and that the intermediate PnBA block is immiscible with the two PMMA blocks.

(8) The MFR, hardness, tackiness, tensile strength at break, tensile elongation at break, and mechanical anisotropy of the polymer (triblock copolymer) obtained in the process (5) were determined according to the aforementioned methods. The results are shown in Table 1 below.

(9)
(i) The triblock copolymer obtained in the process (5) was cut and processed to yield a granule thereof. About 30 g of the granular block copolymer was placed at the center of a mold cavity 150 mm long, 150 mm wide and 1 mm deep in size, was heated at 200° C. under no load for 2 minutes, was subjected to thermocompression molding by heating at 200° C. at a pressure of 1.0 MPa for 3 minutes and cooling to 20° C. while maintaining the same pressure. Thus, a 150-mm square sheet 1 mm thick was produced.

(ii) The sheet prepared in the process (i) was cooled to −50° C. or below, was cut and thereby yielded a specimen (Specimen 1) having, as its section, a plane in parallel with an axis of the melt flow direction (a radial direction from the center to the outer periphery of the sheet) in the thermocompression molding and another specimen (Specimen 2) having, as its section, a plane perpendicular to the axis.

(iii) Specimens 1 and 2 cut out in the process (ii) were respectively stained with phosphotungstic acid to thereby selectively dye a domain comprising an aggregate of PMMA blocks. Electron micrographs of the sections of the stained specimens were taken using transmission electron microscope (TEM) ("H-7100 FA" available from Hitachi, Ltd.; acceleration voltage: 75 kV; objective diaphragm: No. 4). FIG. 1 is a TEM micrograph of the section (the section in parallel with the axis of the melt flow direction of the block copolymer in thermocompression molding) of Specimen 1, and FIG. 2 is a TEM micrograph of the section (section traversal to the axis of the melt flow direction) of Specimen 2.

Figure 2:
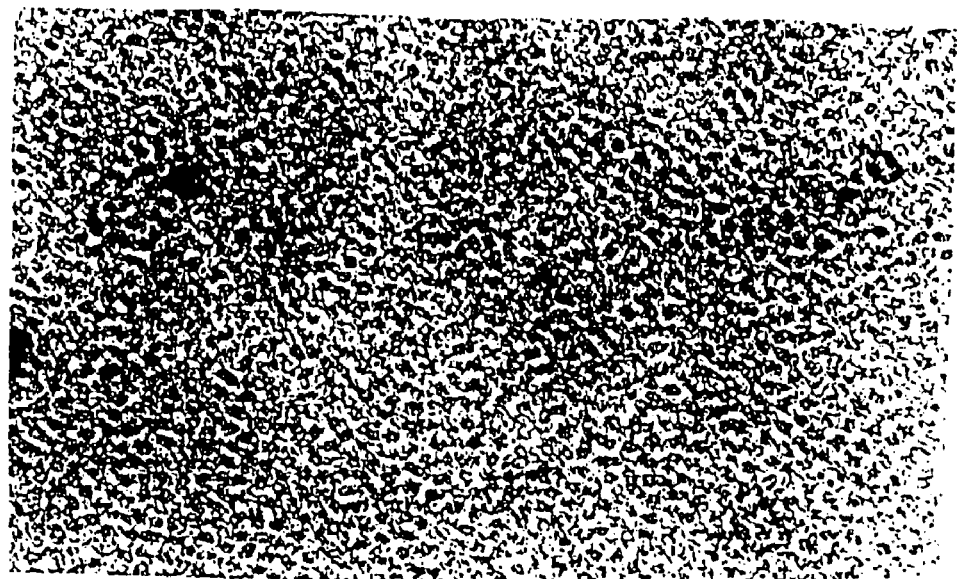
FIG. 2 is a TEM micrograph of a section of a sheet sample prepared by thermocompression-molding of a block copolymer of the present invention according to Example 1 and is obtained by cutting the sheet in a plane traversal to the axis of the melt flow direction of the block copolymer in thermocompression molding.

(iv) FIGS. 1 and 2, namely the TEM micrographs of the sections of the specimens, show that the molded article obtained by melt molding of the triblock copolymer obtained in Example 1 has a PMMA block exhibiting microphase separation to constitute a sphere structure regardless of its melt flow direction. Such a phase separation structure comprising the sphere structure as shown in FIGS. 1 and 2 satisfactorily agrees with the results shown in Table 1, in which $E_L$ (the tensile modulus of elasticity in the melt flow direction of the block copolymer in thermocompression molding) approximates $E_T$ the tensile modulus of elasticity in a traversal direction to the melt flow direction of the block copolymer in thermocompression molding) and the molded article has reduced mechanical anisotropy.

Comparative Example 1

(1) A polymer was obtained by the procedure of Example 1, except that 2.50 g (25.0 mmol) of the first monomer (MMA) was subjected to polymerization for 1.5 hour, and that 2.50 g (25.0 mmol) of the third monomer (MMA) was subjected to polymerization at −30° C. for 1 hour and subsequently at 0° C. for 4 hours. The resulting polymer has an entire number average molecular weight of 114000 and a molecular weight distribution (Mw/Mn) of 1.02, in which the PMMA block obtained in the first MMA polymerization has a number average molecular weight of 12800.

(2) The polymer obtained in the process (1) has a block efficiency of substantially 100% as determined by HPLC analysis. The polymer was found to be a triblock copolymer containing 25.7 wt % MMA unit and 74.3 wt % n-BA unit, represented by formula: PMMA-PnBA-PMMA and comprising PnBA as an intermediate block and one each PMMA combined at both ends of the PnBA block.

(3) A further analysis of the above-prepared triblock copolymer revealed that the weight proportions of the PMMA block at one end, the intermediate PnBA block, and the PMMA block at the other end are 13.0 wt %, 74.3 wt %, and 12.7 wt %, respectively. These results show that, in the PMMA blocks at both ends in the resulting triblock copolymer, a lower number average molecular weight PMMA block has a number average molecular weight [Mn($A_{min}$)] of (12800×12.7)/13.0=12500, and that the ratio [Mn($A_{max}$)/Mn($A_{min}$)] of the number average molecular weight [Mn($A_{max}$)] (12800) of a larger number average molecular weight PMMA block to the number average molecular weight [Mn($A_{min}$)] of the smaller number average molecular weight PMMA block was 12800/12500=1.02.

(4) The above-prepared triblock copolymer was analyzed by DSC and was found that both the two PMMA blocks have a glass transition temperature of 113° C. and the PnBA block has a glass transition temperature of −46° C. These results show that the two PMMA blocks are miscible with each other and that the intermediate PnBA block is immiscible with the two PMMA blocks.

(5) The MFR, hardness, tackiness, tensile strength at break, tensile elongation at break, and mechanical anisotropy of the above-prepared triblock copolymer were determined according to the aforementioned methods. The results are shown in Table 1 below.

Figure 3:
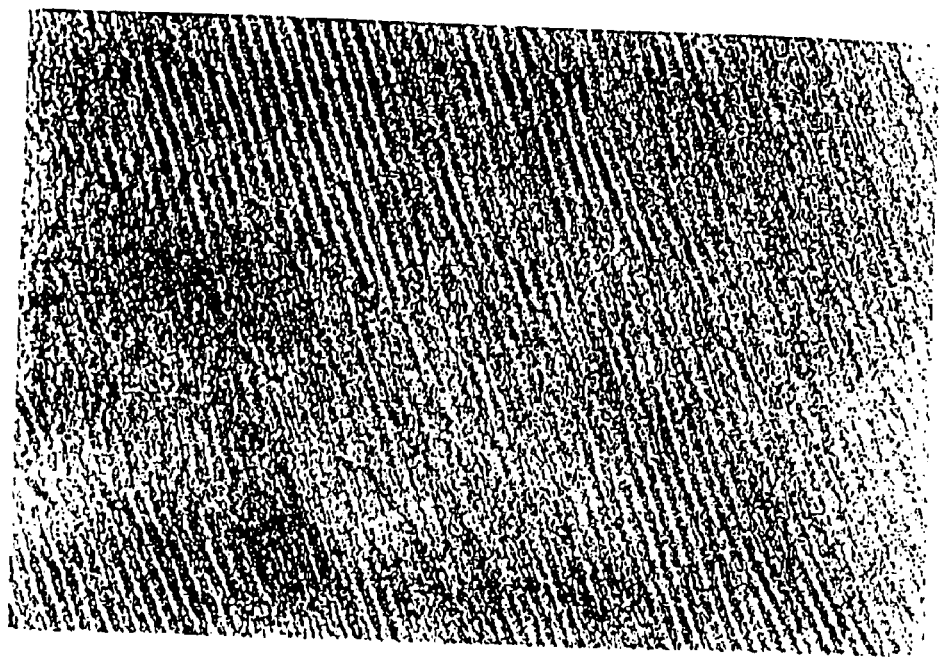
FIG. 3 is a transmission electron microscopic (TEM) micrograph of a section of a sheet sample prepared by thermocompression-molding of a block copolymer according to Comparative Example 1 and is obtained by cutting the sheet in a plane in parallel with the axis of the melt flow direction of the block copolymer in thermocompression molding.
Figure 4:
FIG. 4 is a TEM micrograph of a section of a sheet sample prepared by thermocompression-molding of a block copolymer according to Comparative Example 1 and is obtained by cutting the sheet in a plane traversal to the axis of the melt flow direction of the block copolymer in thermocompression molding.

(6)
  (i) The triblock copolymer obtained in the process (5) was subjected to thermocompression molding in the same manner as in the process (9) of Example 1 and thereby yielded a 150-mm square sheet 1 mm thick.
  (ii) The sheet prepared in the process (i) was cooled to −50° C. or below, was cut and thereby yielded a specimen (Specimen 1) having, as its section, a plane in parallel with an axis of the melt flow direction (a radial direction from the center to the outer periphery of the sheet) in the thermocompression molding and another specimen (Specimen 2) having, as its section, a plane traversal to the axis.
  (iii) Specimens 1 and 2 cut out in the process (ii) were respectively stained with phosphotungstic acid to thereby selectively dye a domain comprising an aggregate of PMMA blocks. Electron micrographs of the sections of the stained specimens were taken using transmission electron microscope (TEM) ("H-7100 FA" available from Hitachi, Ltd.; acceleration voltage: 75 kV; objective diaphragm: No. 4). FIG. 3 is a TEM micrograph of the section (the section in parallel with the axis of the melt flow direction of the block copolymer in thermocompression molding) of Specimen 1, and FIG. 4 is a TEM micrograph of the section (section traversal to the axis of the melt flow direction) of Specimen 2.
  (iv) FIGS. 3 and 4, namely the TEM micrographs of the sections of Specimens 1 and 2, show that the molded article obtained by melt molding of the triblock copolymer obtained in Comparative Example 1 has a PMMA block exhibiting microphase separation to constitute a cylindrical structure with the melt flow direction as its axis (FIG. 3) and that the phase separation structure exhibits a significantly varying shape between the melt flow direction and a traversal direction to the melt flow direction of the block copolymer. Such a phase separation structure as shown in FIGS. 3 and 4 satisfactorily agrees with the large mechanical anisotropy in the molded article shown in Table 1, in which the tensile modulus of elasticity $E_L$ in the melt flow direction of the block copolymer in thermocompression molding largely differs from the tensile modulus of elasticity $L_T$ in a traversal direction to the melt flow direction of the block copolymer in thermocompression molding.

Example 2

(1) A polymer was obtained by the procedure of Example 1, except that 5.14 g (51.4 mmol) of the first monomer (MMA) was subjected to polymerization for 3 hours, that 14.0 g (109 mmol) of the second monomer (n-BA) was used, and that 0.86 g (8.6 mmol) of the third monomer (MMA) was used. The resulting polymer has an entire number average molecular weight of 112000 and a molecular weight distribution (Mw/Mn) of 1.02, in which the PMMA block obtained in the first MMA polymerization has a number average molecular weight of 27800.

(2) The polymer obtained in the process (1) has a block efficiency of substantially 100% as determined by HPLC analysis. The polymer was found to be a triblock copolymer containing 29.3 wt % MMA unit and 70.7 wt % n-BA unit, represented by formula: PMMA-PnBA-PMMA and comprising PnBA as an intermediate block and one each PMMA combined at both ends of the PnBA block.

(3) A further analysis of the above-prepared triblock copolymer revealed that the weight proportions of the PMMA block at one end, the intermediate PnBA block, and the PMMA block at the other end were 25.1 wt %, 70.7 wt %, and 4.2 wt %, respectively. These results show that, in the PMMA blocks at both ends in the triblock copolymer ultimately obtained, a smaller number average molecular weight PMMA block has a number average molecular weight [Mn($A_{min}$)] of (27800×4.2)/25.1=4700, and that the ratio [Mn($A_{max}$)/Mn($A_{min}$)] of the number average molecular weight [Mn($A_{max}$)] of a higher number average molecular weight PMMA block to the number average molecular weight [Mn($A_{min}$)] of the smaller number average molecular weight PMMA block is 27800/4700=5.91.

(4) The above-prepared triblock copolymer was analyzed by DSC and was found that both the two PMMA blocks have a glass transition temperature of 115° C. and the PnBA block has a glass transition temperature of −48° C. These results show that the two PMMA blocks are miscible with each other and that the intermediate PnBA block is immiscible with the two PMMA blocks.

(5) The MFR, hardness, tackiness, tensile strength at break, tensile elongation at break, and mechanical anisotropy of the triblock copolymer were determined according to the aforementioned methods. The results are shown in Table 1 below.

Comparative Example 2

(1) A polymer was obtained by the procedure of Example 1, except that 3.0 g (30 mmol) of the first monomer (MMA)

was used, that 14.0 g (109 mmol) of the second monomer (n-BA) was used, and that 3.0 g (30 mmol) of the third monomer (MMA) was subjected to polymerization at −30° C. for 1 hour and subsequently at 0° C. for 6 hours. The resulting polymer has an entire number average molecular weight of 109000 and a molecular weight distribution (Mw/Mn) of 1.02, in which the PMMA block obtained in the first MMA polymerization has a number average molecular weight of 14400.

(2) The polymer obtained in the process (1) has a block efficiency of substantially 100% as determined by HPLC analysis. The polymer was found to be a triblock copolymer containing 30.0 wt % MMA unit and 70.0 wt % n-BA unit, represented by formula: PMMA-PnBA-PMMA and comprising PnBA as an intermediate block and one each PMMA combined at both ends of the PnBA block.

(3) A further analysis of the above-prepared triblock copolymer revealed that the weight proportions of the PMMA block at one end, the intermediate PnBA block, and the PMMA block at the other end are 15.0 wt %, 70.0 wt %, and 15.0 wt %, respectively. These results show that, in the PMMA blocks at both ends in the triblock copolymer, a lower number average molecular weight PMMA block has a number average molecular weight $[Mn(A_{min})]$ of $(14400 \times 15.0)/15.0 = 14400$, and that the ratio $[Mn(A_{max})/Mn(A_{min})]$ of the number average molecular weight $[Mn(A_{max})]$ of a larger number average molecular weight PMMA block to the number average molecular weight $[Mn(A_{min})]$ of the smaller number average molecular weight PMMA block is $14400/14400 = 1.00$.

(4) The above-prepared triblock copolymer was analyzed by DSC and was found that both the two PMMA blocks have a glass transition temperature of 109° C. and the PnBA block has a glass transition temperature of −44° C. These results show that the two PMMA blocks are miscible with each other and that the intermediate PnBA block is immiscible with the two PMMA blocks.

(5) The MFR, hardness, tackiness, tensile strength at break, tensile elongation at break, and mechanical anisotropy of the above-prepared triblock copolymer were determined according to the aforementioned methods. The results are shown in Table 1 below.

Comparative Example 3

(1) A polymer was obtained by the procedure of Example 1, except that 8.75 g (87.5 mmol) of the first monomer (MMA) was subjected to polymerization for 4 hours, that 10.0 g (78 mmol) of the second monomer (n-BA) was used, and that 2.63 g (26.3 mmol) of the third monomer (MMA) was used. The resulting polymer has an entire number average molecular weight of 114000 and a molecular weight distribution (Mw/Mn) of 1.02, in which the PMMA block obtained in the first MMA polymerization has a number average molecular weight of 51000.

(2) The polymer obtained in the process (1) has a block efficiency of substantially 100% as determined by HPLC analysis. The polymer a triblock copolymer containing 51.2 wt % MMA unit and 48.8 wt % n-BA unit, represented by formula: PMMA-PnBA-PMMA and comprising PnBA as an intermediate block and one each PMMA combined at both ends of the PnBA block.

(3) A further analysis of the above-prepared triblock copolymer revealed that the weight proportions of the PMMA block at one end, the intermediate PnBA block, and the PMMA block at the other end were 38.9 wt %, 48.8 wt %, and 12.3 wt %, respectively. These results show that, in the PMMA blocks at both ends in the triblock copolymer, a smaller number average molecular weight PMMA block has a number average molecular weight $[Mn(A_{min})]$ of $(51000 \times 12.3)/38.9 = 16100$, and that the ratio $[Mn(A_{max})/Mn(A_{min})]$ of the number average molecular weight $[Mn(A_{max})]$ of a larger number average molecular weight PMMA block to the number average molecular weight $[Mn(A_{min})]$ of the smaller number average molecular weight PMMA block is $51000/16100 = 3.17$.

(4) The above-prepared triblock copolymer was analyzed by DSC and was found that both the two PMMA blocks have a glass transition temperature of 120° C. and the PnBA block has a glass transition temperature of −45° C. These results show that the two PMMA blocks are miscible with each other and that the intermediate PnBA block is immiscible with the two PMMA blocks.

(5) The MFR, hardness, tackiness, tensile strength at break, tensile elongation at break, and mechanical anisotropy of the above-prepared triblock copolymer were determined according to the aforementioned methods. The results are shown in Table 1 below.

Comparative Example 4

(1) A polymer was obtained by the procedure of Example 1, except that 2.80 g (28.0 mmol) of the first monomer (MMA) was subjected to polymerization for 1 hour, that 18.0 g (140 mmol) of the second monomer (n-BA) was used, and that 2.0 g (20.0 mmol) of the third monomer (MMA) was used. The resulting polymer has an entire number average molecular weight of 122000 and a molecular weight distribution (Mw/Mn) of 1.02, in which the PMMA block obtained in the first MMA polymerization has a number average molecular weight of 14800.

(2) The polymer obtained in the process (1) has a block efficiency of substantially 100% as determined by HPLC analysis. The polymer a triblock copolymer containing 21.1 wt % MMA unit and 79.9 wt % n-BA unit, represented by formula: PMMA-PnBA-PMMA and comprising PnBA as an intermediate block and one each PMMA combined at both ends of the PnBA block.

(3) A further analysis of the above-prepared triblock copolymer revealed that the mass proportions of the PMMA block at one end, the intermediate PnBA block, and the PMMA block at the other end were 12.4 wt %, 79.9 wt %, and 8.7 wt %, respectively. These results show that, in the PMMA blocks at both ends in the triblock copolymer, a larger number average molecular weight PMMA block has a number average molecular weight $[Mn(A_{max})]$ of $(14800 \times 8.7)/12.4 = 10400$, and that the ratio $[Mn(A_{max})/Mn(A_{min})]$ of the number average molecular weight $[Mn(A_{max})]$ of the larger number average molecular weight PMMA block to the number average molecular weight $[Mn(A_{min})]$ of a smaller number average molecular weight PMMA block was $14800/10400 = 1.42$.

(4) The above-prepared triblock copolymer was analyzed by DSC and was found that both the two PMMA blocks have a glass transition temperature of 117° C. and the PnBA block has a glass transition temperature of −46° C. These results show that the two PMMA blocks are miscible with each other and that the intermediate PnBA block is immiscible with the two PMMA blocks.

(5) The MFR, hardness, tackiness, tensile strength at break, tensile elongation at break, and mechanical anisotropy of the above-prepared triblock copolymer were determined according to the aforementioned methods. The results are shown in Table 1 below.

Example 3

(1) A polymer was obtained by the procedure of Example 1, except that 4.50 g (45.0 mmol) of the first monomer (MMA) was subjected to polymerization for 3.5 hours with 0.10 mmol (0.077 ml of a cyclohexane solution having a concentration of 1.3 mol/liter) of sec-butyl lithium as the polymerization initiator, and that 0.50 g (5.0 mmol) of the third monomer (MMA) was used. The resulting polymer has an entire number average molecular weight of 201000 and a molecular weight distribution (Mw/Mn) of 1.02, in which the PMMA block obtained in the first MMA polymerization has a number average molecular weight of 45000.

(2) The polymer obtained in the process (1) has a block efficiency of substantially 100% as determined by HPLC analysis. The polymer was found to be a triblock copolymer containing 24.7 wt % MMA unit and 75.3 wt % n-BA unit, represented by formula: PMMA-PnBA-PMMA and comprising PnBA as an intermediate block and one each PMMA combined at both ends of the PnBA block.

(3) A further analysis of the above-prepared triblock copolymer revealed that the mass proportions of the PMMA block at one end, the intermediate PnBA block, and the PMMA block at the other end were 22.5 wt %, 75.2 wt %, and 2.2 wt %, respectively. These results show that, in the PMMA blocks at both ends in the triblock copolymer ultimately obtained, a smaller number average molecular weight PMMA block has a number average molecular weight $[Mn(A_{min})]$ of $(45000 \times 2.2)/22.5 = 4400$, and that the ratio $[Mn(A_{max})/Mn(A_{min})]$ of the number average molecular weight $[Mn(A_{max})]$ of a larger number average molecular weight PMMA block to the number average molecular weight $[Mn(A_{min})]$ of the smaller number average molecular weight PMMA block was $45000/4400 = 10.23$.

(4) The above-prepared triblock copolymer was analyzed by DSC and was found that both the two PMMA blocks have a glass transition temperature of 116° C. and the PnBA block has a glass transition temperature of −46° C. These results show that the two PMMA blocks are miscible with each other and that the intermediate PnBA block is immiscible with the two PMMA blocks.

(5) The MFR, hardness, tackiness, tensile strength at break, tensile elongation at break, and mechanical anisotropy of the above-prepared triblock copolymer were determined according to the aforementioned methods. The results are shown in Table 1 below.

Table 1 shows that each of the block copolymers (triblock copolymers) of the present invention obtained by anionic polymerization in Examples 1 to 3 comprises two polymer blocks (PMMA blocks) miscible with each other and one polymer block (PnBA) sandwiched between the two polymer blocks and immiscible with the two polymer blocks. In addition, in the two polymer blocks (PMMA blocks) at both ends, the ratio $[Mn(A_{max})/Mn(A_{min})]$ of the number average molecular weight $[Mn(A_{max})]$ of a polymer block having a larger number average molecular weight to the number average molecular weight $[Mn(A_{min})]$ of a polymer block having a smaller number average molecular weight is 2 or more. The content of the two polymer blocks (PMMA blocks) at both ends is within a range from 20 wt % to 45 wt % based on the total weight of the block copolymer. Consequently, the block copolymers obtained according to Examples 1 to 3 have appropriate flexibility as shown by their hardness.

The block copolymers of Examples 1 to 3 each have a high MFR and exhibit satisfactorily moldability.

Molded articles obtained from the block copolymers of Examples 1 to 3 each exhibit low tackiness, reduced surface stickiness, have reduced differences in mechanical properties (reduced mechanical anisotropy) between the melt flow direction and the melt traversal direction of the polymer in molding and thereby exhibit satisfactory mechanical isotropy.

In addition, the block copolymers of Examples 1 to 3 have satisfactory basic mechanical properties as shown by their tensile strength at break and tensile elongation at break.

In contrast, the block copolymers obtained according to Comparative Examples 1 and 2 do not satisfy the requirements in the present invention. In these block copolymers, the ratio $[Mn(A_{max})/Mn(A_{min})]$ of the number average molecular weight $[Mn(A_{max})]$ of a polymer block having a larger number average molecular weight to the number average molecular weight $[Mn(A_{min})]$ of a polymer block having a smaller number average molecular weight is less than 2, although the total content of the two PMMA blocks in the block copolymers is within a range from 20 wt % to 45 wt %. As a result, the block copolymers of Comparative Examples 1 and 2 each have a high hardness and lack flexibility.

TABLE 1

|  | Ex. 1 | Com. Ex. 1 | Ex. 2 | Com. Ex. 2 | Com. Ex. 3 | Com. Ex. 4 | Ex. 3 |
|---|---|---|---|---|---|---|---|
| [Block Copolymer Structure] $Mn(A_{min})$[1] | 5600 | 12500 | 4700 | 14400 | 16100 | 10400 | 4400 |
| Entire Mn[2] | 112000 | 114000 | 112000 | 109000 | 114000 | 122000 | 201000 |
| $Mn(A_{max})/Mn(A_{min})$[3] | 3.41 | 1.02 | 5.91 | 1.00 | 3.17 | 1.42 | 10.23 |
| Total Content of PMMA Blocks[4] (wt %) | 24.3 | 25.7 | 29.3 | 30.0 | 51.2 | 21.1 | 24.7 |
| [Physical Properties[5]] MFR (g/10-min) | 8.7 | 1.5 | 11.4 | 0.7 | 0.7 | 7.1 | 2.2 |
| Hardness (JIS-A) | 28 | 68 | 34 | 82 | 94 | 23 | 28 |
| Tackiness (MPa) | 0.40 | 0.20 | 0.33 | 0.17 | <0.01 | 0.82 | 0.37 |
| Tensile Strength at Break (MPa) | 12.0 | 6.6 | 7.5 | 9.5 | 18.4 | 9.6 | 10.8 |
| Tensile Elongation at Break (%) | 520 | 500 | 400 | 190 | 100 | 550 | 600 |
| Mechanical Anisotropy $E_L(MPa)/E_T(MPa)$[6] | 0.7/0.5 | 20/0.6 | 0.8/0.6 | 12/0.4 | 54/37 | 0.3/0.2 | 0.7/0.5 |

[1] The number average molecular weight $[Mn(A_{min})]$ of the smaller number average molecular weight PMMA block
[2] The number average molecular weight of the entire block copolymer
[3] The ratio $[Mn(A_{max})/Mn(A_{min})]$ of the number average molecular weight $[Mn(A_{max})]$ of a PMMA block having a larger number average molecular weight to the number average molecular weight $[Mn(A_{min})]$ of a PMMA block having a smaller number average molecular weight
[4] The total content of PMMA blocks based on the total weight of the block copolymer
[5] The physical properties of the block copolymer or a molded article comprising the block copolymer
[6] The tensile modulus of elasticity $(E_L)$ in the melt flow direction and the tensile modulus of elasticity $(E_T)$ in the traversal melt flow direction of a melt molded article comprising the block copolymer In addition, molded articles obtained from the block copolymers of Comparative Examples 1 and 2 have significantly large differences in mechanical properties between the melt flow direction of the polymer in molding and a traversal direction thereto and exhibit remarkable mechanical anisotropy.

The block copolymer obtained according to Comparative Example 3 has a total content of the two PMMA blocks of 51.2 wt %, out of the range from 20 wt % to 45 wt %, although the ratio [Mn($A_{max}$)/Mn($A_{min}$)] of the number average molecular weight [Mn($A_{max}$)] of a polymer block having a larger number average molecular weight to the number average molecular weight [Mn($A_{min}$)] of a polymer block having a smaller number average molecular weight is equal to or more than 2. Consequently, the block copolymer of Comparative Example 3 exhibit a very high hardness and lacks flexibility.

The block copolymer obtained according to Comparative Example 4 has a total content of the two PMMA blocks of 21.1 wt % and thereby exhibits flexibility comparable to those of Examples 1 and 3. However, in this block copolymer, the ratio [Mn($A_{max}$)/Mn($A_{min}$)] of the number average molecular weight [Mn($A_{max}$)] of a polymer block having a larger number average molecular weight to the number average molecular weight [Mn($A_{min}$)] of a polymer block having a smaller number average molecular weight is less than 2. The block copolymer of Comparative Example 4 thereby has a large tackiness, showing that a molded article obtained from the block copolymer exhibits remarkable surface stickiness.

Example 4

(1) The procedure of Example 1 was repeated, except that 4.0 g of the first monomer (MMA) was subjected to polymerization for 3.5 hours, that 14.0 g of the second monomer (n-BA) was used, and 1.8 g of methyl acrylate (MA) as the third monomer instead of MMA was subjected to polymerization at −30° C. for 2 minutes. After polymerization, no unreacted MA was observed in the polymerization system, showing that a conversion from MA is 100%.

(2) As a result, a polymer having an entire number average molecular weight of 95800 and a molecular weight distribution (Mw/Mn) of 1.06 was obtained, in which the PMMA block obtained in the first MMA polymerization in (1) has a number average molecular weight of 21800.

(3) The polymer obtained in the process (2) has a block efficiency of substantially 100% as determined by HPLC analysis. The polymer was found to be a triblock copolymer containing 20.4 wt % MMA unit, 71.2 wt % n-BA unit, and 8.4 wt % MA unit, represented by formula: PMMA-PnBA-PMA and comprising PnBA as an intermediate block, one PMMA combined at one end of the PnBA block and one PMA combined at the other end.

(4) These results show that the PMA block has a number average molecular weight of (21800×8.4)/20.4=9000.

(5) The triblock copolymer was analyzed by DSC to find that a glass transition temperature (−40° C.) corresponding to PnBA and another glass transition temperature (around 90° C.) derived from a domain formed by a homogenous mixture of the PMMA block and the PMA block were observed. These results show that the PMMA block and the PMA block are miscible with each other and that the intermediate PnBA block is immiscible with the domain formed from the PMMA block and the PMA block.

(6) Accordingly, the PMA end block in the resulting triblock copolymer was a polymer block $A_{min}$ having the smallest number average molecular weight among the polymer blocks constituting the polymer blocks A miscible with each other, and the ratio [Mn($A_{max}$)/Mn($A_{min}$)] of the number average molecular weight of the PMMA end block as a polymer block $A_{max}$ having the largest number average molecular weight to that of $A_{min}$ was 21800/9000=2.4.

(7) The above-prepared triblock copolymer has a hardness, a tensile strength at break, and a tensile elongation at break of 43, 3.2 MPa, and 270% as determined according to the aforementioned methods, showing that it has elastomeric properties.

Example 5

(1) The procedure of Example 4 was repeated, except that 0.19 ml (0.25 mmol) of sec-butyl lithium as the polymerization initiator was used, and that ethyl acrylate (EA) instead of methyl acrylate (MA) was used as the third monomer. After polymerization, no unreacted MA was observed in the polymerization system, showing that a conversion from EA is 100%.

(2) Thus, a polymer having an entire number average molecular weight of 88500 and a molecular weight distribution (Mw/Mn) of 1.02 was obtained, in which the PMMA block obtained in the first MMA polymerization in (1) has a number average molecular weight of 17100.

(3) The polymer obtained in the process (2) has a block efficiency of substantially 100% as determined by HPLC analysis. The polymer was found to be a triblock copolymer containing 20.5 wt % MMA unit, 70.9 wt % n-BA unit, and 8.6 wt % EA unit, represented by formula: PMMA-PnBA-PEA and comprising PnBA as an intermediate block, one PMMA combined at one end of the PnBA block and one PMA combined at the other end.

(4) These results show that the PEA block has a number average molecular weight of (17100×8.6)/20.5=7200.

(5) The triblock copolymer was analyzed by DSC to find that a glass transition temperature (−42° C.) corresponding to PnBA and another glass transition temperature (around 60° C.) derived from a domain formed by a homogenous mixture of the PMMA block and the PEA block were observed. These results show that the PMMA block and the PEA block are miscible with each other and that the intermediate PnBA block is immiscible with the domain formed from the PMMA block and the PEA block.

(6) Accordingly, the PEA end block in the resulting triblock copolymer was a polymer block $A_{min}$ having the smallest number average molecular weight among the polymer blocks constituting the polymer miscible with each other, and the ratio [Mn($A_{max}$)/Mn($A_{min}$)] of the number average molecular weight of the PMMA end block as a polymer block $A_{max}$ having the largest number average molecular weight to that of $A_{min}$ was 17100/7200=2.4.

The results in Examples 4 and 5 show that the total polymerization time for the production of block copolymers can be shortened by using a polymer block (PMA or PEA) obtained by polymerizing an acrylic ester monomer MA or EA as at least one of the two polymer miscible with each other, since such an acrylic ester monomer can be polymerized in a shorter time.

Each of PMA and PEA constituting the acrylic ester polymer blocks has a glass transition temperature lower than room temperature and does not work as a hard segment. However, by forming a homogeneous mixture of the PMMA block and the PMA block or PEA block in the block copolymer and by setting the ratio of the number average molecular weights at 2 or more, a domain formed by a homogenous mixture of the PMA block or PEA block with the PMMA block in the block copolymer can have a glass transition temperature of equal to or higher than room temperature and can work as a hard segment to allow the block copolymer to exhibit elastomeric properties to thereby work as a thermoplastic elastomer.

Example 6

Determination of Adhesion (1) The block copolymer obtained according to Example 5 having a melt viscosity of 13 N·s/m² as determined by the aforementioned method was dissolved in toluene and thereby yielded a solution having a concentration of 35 wt %. The solution was applied to a thickness of about 250 μm onto a poly(ethylene terephthalate) film, was dried at 160° C. for 30 minutes and thereby yielded a pressure-sensitive adhesive tape for the determination of adhesive properties.

(2) The adhesive properties (adhesive strength and holding power) of the pressure-sensitive adhesive tape prepared in the process (1) were determined according to the aforementioned methods. The results are shown in Table 2 below.

Comparative Example 5

(1) A PMMA-PnBA-PMMA block copolymer was prepared by the procedure of Example 1, except that the amounts of the supplied monomers were changed. The resulting PMMA-PnBA-PMMA block copolymer contains 12.5 wt %, 75.0 wt %, and 12.5 wt % of a PMMA block at one end, an intermediate PnBA block, and another PMMA block at the other end, respectively, and has a ratio [Mn($A_{max}$)/Mn($A_{min}$)] of 1.0, a number average molecular weight of 66700, a molecular weight distribution (Mw/Mn) of 1.05, and a block efficiency of 99%. The PMMA blocks at both ends of the block copolymer have an equal number average molecular weight of 7200.

(2) The melt viscosity of the block copolymer obtained in the process (1) was determined according to the method mentioned above. The result is shown in Table 2.

(3) A pressure-sensitive adhesive tape was prepared using the block copolymer obtained in the process (1) in the same manner as in the process (1) of Example 6, and its adhesive properties (adhesive strength and holding power) were determined according to the aforementioned methods. The results are shown in Table 2.

Comparative Example 6

(1) A PMMA-PnBA-PMMA block copolymer was prepared by the procedure of Example 1, except that the amounts of the supplied monomers were changed. The resulting PMMA-PnBA-PMMA block copolymer contains 10.0 wt %, 80.0 wt %, and 10.0 wt % of a PMMA block at one end, an intermediate PnBA block, and another PMMA block at the other end, respectively, and has a ratio [Mn($A_{max}$)/Mn($A_{min}$)] of 1.0, a number average molecular weight of 75400, a molecular weight distribution (Mw/Mn) of 1.13, and a block efficiency of 96%. The PMMA blocks at both ends have an equal number average molecular weight of 6900.

(2) The melt viscosity of the block copolymer obtained in the process (1) was determined according to the method mentioned above. The result is shown in Table 2.

(3) A pressure-sensitive adhesive tape was prepared using the block copolymer obtained in the process (1) in the same manner as in the process (1) of Example 6, and its adhesive properties (adhesive strength and holding power) were determined according to the aforementioned methods. The results are shown in Table 2.

TABLE 2

|  | Ex. 6 | Com. Ex. 5 | Com. Ex. 6 |
| --- | --- | --- | --- |
| Block Structure of Block Copolymer | PMMA-PnBA-PEA | PMMA-PnBA-PMMA | PMMA-PnBA-PMMA |
| Mn of Entire Block Copolymer | 88500 | 66700 | 75400 |
| Mn of Polymer Block $A_{min}$ | 7200 | 7200 | 6900 |
| [Mn($A_{max}$)/Mn($A_{min}$)] | 2.4 | 1.0 | 1.0 |
| Total Content of Polymer Blocks A (wt %) | 29.1 | 25.0 | 20.0 |
| Melt Viscosity of Block Copolymer[1] | 13 | 47 | 96 |
| Physical Properties of Pressure-sensitive Adhesive Tape |  |  |  |
| Adhesive Strength |  |  |  |
| to Stainless Steel Plate (g/cm) | 260 | 93 | 280 |
| to Polyethylene Sheet (g/cm) | 210 | 50 | 16 |
| Holding Power (70° C.) |  |  |  |
| Holding Time (min) | 240 | 240 | 240 |
| Slippage (mm) | 0.1 or less | 0.1 or less | 0.1 or less |

[1]The melt viscosity at 180° C. (unit: N · s/m²)

Table 2 shows that the block copolymer of Example 5 used in Example 6 has a lower melt viscosity and thereby higher melt fluidity than the block copolymers of Comparative Examples 5 and 6. This is because the block copolymer of Example 5 contains a PMMA block at one of its ends, a PEA block miscible with the PMMA block at the other end, and a PnBA block between these two blocks, which PnBA block is immiscible with the two blocks, and has a ratio [Mn($A_{max}$)/Mn($A_{min}$)] of the number average molecular weight [Mn($A_{max}$)] of the PMMA block to the number average molecular weight [Mn($A_{min}$)] of the PEA block of 2.4. In contrast, the block copolymers of Comparative Examples 5 and 6 each contain PMMA-PnBA-PMMA, in which the two PMMA blocks at both ends have the same number-average molecular weight.

In addition, the pressure-sensitive adhesive tape of Example 6 obtained by using the block copolymer of Example 5 has high adhesive strength both to the polyethylene sheet and to the stainless steel plate and exhibits satisfactory adhesive properties. These results show that the block copolymer of Example 5 is useful as a pressure-sensitive adhesive.

In contrast, the block copolymer of Comparative Example 5 has a high melt viscosity and thereby exhibits low melt fluidity. The pressure-sensitive adhesive tape prepared from the block copolymer of Comparative Example 5 has low adhesive strength both to the polyethylene sheet and to the stainless steel plate and thereby has lower adhesive properties than that of Example 6.

The block copolymer of Comparative Example 6 has a high melt viscosity and thereby exhibits low melt fluidity. The pressure-sensitive adhesive tape prepared from the block copolymer of Comparative Example 6 has low adhesive strength to the polyethylene sheet, although it has high adhesive strength to the stainless steel plate, and thereby has lower adhesive properties than that of Example 6.

INDUSTRIAL APPLICABILITY

The block copolymers of the present invention have a low melt viscosity and satisfactory melt fluidity, have satisfactory moldability and coatability in the production of pressure-sensitive adhesive tapes and other products and have appropriate flexibility.

The block copolymers of the present invention also have excellent basic mechanical properties such as tensile strength at break and tensile elongation at break.

Molded articles prepared by melt molding of the block copolymers of the present invention exhibit small differences in mechanical properties between the melt flow direction of the polymer in molding and another direction, exhibit reduced mechanical anisotropy and have excellent mechanical isotropy.

The block copolymers of the present invention can be molded into target molded articles with high dimensional accuracy without disadvantages such as molding shrinkage, warpage, and distortion.

Molded articles prepared by molding specific block copolymers among these block copolymers of the present invention have low tackiness, exhibit reduced surface stickiness to thereby be free from adhesion or stickiness of molded articles with each other and have satisfactory handleability. The specific block copolymers just mentioned above are block copolymers containing poly(methyl methacrylate) polymer blocks as the two or more polymer blocks A miscible with each other and a (meth)acrylic ester polymer block immiscible with the polymer blocks A as the polymer block B. More preferably, the block copolymers are triblock copolymers as shown in Examples 1 to 3, having a poly(n-butyl acrylate) as an intermediate polymer block, and two polymer blocks comprising methyl methacrylate polymers at both ends of the intermediate polymer block. These poly(methyl methacrylate) blocks have different number average molecular weights and have a ratio $Mn(A_{max})/Mn(A_{min})$ of 2 or more.

Among the block copolymers of the present invention, those containing an acrylic ester polymer block as at least one of the two or more polymer blocks A miscible with each other and constituting a hard segment can be used as excellent thermoplastic elastomers, have a low melt viscosity, thereby exhibit high melt fluidity, have satisfactory adhesive strength and can thereby be used as polymer materials in pressure-sensitive adhesive compositions.

The production process of the present invention can easily and advantageously produce the block copolymers of the present invention having the aforementioned satisfactory properties on a industrial scale.

What is claimed is:

1. A block copolymer:
   (a) being an anionic polymerization product;
   (b) comprising two or more polymer blocks A being miscible with each other, and at least one (meth)acrylic ester polymer block B being immiscible with the polymer blocks A;
   (c) having a ratio $[Mn(A_{max})/(Mn(A_{min})]$ of 2 or more, where the ratio $[Mn(A_{max})/(Mn(A_{min})]$ is the ratio of the largest number average molecular weight $[Mn]A_{max})]$ to the smallest number average molecular weight $[Mn]A_{min})]$ among the two or more polymer blocks A;
   (d) having at least one block bonding represented by formula (I):

$$(-)A_{max}-B-A_{min}(-) \qquad (I)$$

wherein $A_{max}$ is the polymer block $A_{max}$ having the largest number average molecular weight among the polymer blocks A; $A_{min}$ is the polymer block $A_{min}$ that has the smallest number average molecular weight among the polymer blocks A; B is the polymer block B; "—" is a chemical bond connecting polymer blocks; and (—) indicates the optional presence of a chemical bond; and
   (e) having a total content of polymer blocks A ranging from 20 wt % to 45 wt % of the total weight of the block copolymer.

2. The block copolymer according to claim 1, wherein the block copolymer is a block copolymer obtained by anionic polymerization in the presence of an organic alkali metal compound and/or an organic alkaline earth metal compound as a polymerization initiator.

3. The block copolymer according to one of claims 1 and 2, wherein at least one of the two or more polymer blocks A has a glass transition temperature above 25° C., and the polymer block B has a glass transition temperature of lower than or equal to 25° C., and an acrylic ester polymer block which is immiscible with $A_{max}$ and $A_{min}$ as B.

4. The block copolymer according to claim 1, wherein the polymer block $A_{min}$ has a number average molecular weight ranging from 1000 to 15000.

5. The block copolymer according to claim 1, wherein the polymer blocks A are (meth)acrylic ester polymer blocks that are immiscible with the polymer block B.

6. The block copolymer according to claim 1, wherein the polymer blocks A can form a sphere microphase separation structure in a melt-blended material of the block copolymer.

7. The block copolymer according to claim 1, wherein the block polymer is a triblock copolymer having a block sequence represented by formula (II):

$$A_{max}-B-A_{min} \qquad (II)$$

wherein $A_{max}$ is the polymer block $A_{max}$ having the largest number average molecular weight among the polymer blocks A; $A_{min}$ is the polymer block $A_{min}$ having the smallest number average molecular weight among the polymer blocks A; B is the polymer block B; and "—" is a chemical bond connecting polymer blocks.

8. The block copolymer according to claim 7, wherein the block copolymer is a triblock copolymer comprising methacrylic ester polymer blocks which are miscible with each other as $A_{max}$ and $A_{min}$ and an acrylic ester polymer block which is immiscible with $A_{max}$ and $A_{min}$ as B.

9. The block copolymer according to claim 7, wherein the block copolymer is a triblock copolymer comprising a methacrylic ester polymer block as $A_{max}$, an acrylic ester polymer block being miscible with $A_{max}$ and $A_{min}$, and an acrylic ester polymer block being immiscible with $A_{max}$ and $A_{min}$ as B.

10. A process for producing a block copolymer, the process comprising:
   (i) performing anionic monomer polymerization in the presence of an organic alkali metal compound and/or an organic alkaline earth metal compound as a polymerization initiator to thereby yield the block copolymer of claim 1;
   (ii) controlling the ratio ($W_{max}/W_{min}$) to a value of 2 or more in the production of the block copolymer, wherein the ratio ($W_{max}/W_{min}$) is the ratio of the weight ($W_{max}$) of a monomer used for forming a polymer block $A_{max}$ to the weight ($W_{min}$) of a monomer used for forming a polymer block $A_{min}$ to yield polymer blocks as the two or more polymer blocks A constituting the block copolymer and being miscible with each other to thereby ensure the resulting block copolymer to have a ratio $[Mn(A_{max})/(Mn(A_{min}))]$ of 2 or more, wherein the ratio $[Mn(A_{max})/(Mn(A_{min})]$ is the ratio of the largest number average molecular weight $[Mn]A_{max})]$ to the smallest number average molecular weight $[Mn]A_{min})]$ among the polymer blocks A; and
   (iii) controlling the total amount of monomers for forming the polymer blocks A within a range from 20 wt % to 45 wt % based on the total amount of monomers for forming the block copolymer.

11. A process for producing a triblock copolymer, the process comprising:
   (i) performing anionic monomer polymerization in the presence of an organic alkali metal compound and/or an organic alkaline earth metal compound as a polymerization initiator to thereby yield the block copolymer of claim 7;
   (ii) controlling the ratio ($W_{max}/W_{min}$) to a value of 2 or more in the production of the block copolymer, wherein the ratio ($W_{max}/W_{min}$) is the ratio of the weight ($W_{max}$) of the monomer that is polymerized to form a polymer block $A_{max}$ to the weight ($W_{min}$) of the monomer that is polymerized to form a polymer block $A_{min}$; and
   (iii) controlling the total amount of monomers for forming the polymer block $A_{max}$ and the polymer block $A_{min}$ within a range from 20 wt % to 45 wt % based on the total amount of monomers for forming the block copolymer.

12. The process according to claim 10 or 11, further comprising conducting the polymerization in the presence of an organoaluminum compound as a co-catalyst.

13. A molded article comprising the block copolymer of claim 1.

14. A pressure-sensitive adhesive composition comprising the block copolymer of claim 1.

15. The block copolymer according to claim 1, wherein polymer block A is constituted of a polymer selected from the group consisting of polymers of vinylaromatic compounds, polybutadiene, polyisoprenes, polymers of conjugated diene monomers and hydrogenated products thereof, polymers of lactones, alkylsiloxanes polymers, polymers of alkylene oxides, vinylpyridine polymers, acrylic ester polymers and hydrogenated products thereof, polymers of acrylamide compounds, polymers of unsaturated aldehydes and polymers of unsaturated nitriles.

16. The block copolymer according to claim 1, wherein polymer block B is an acrylic ester or methacrylic ester polymer block.

17. The block copolymer according to claim 1, wherein the ratio $[Mn(A_{max})/(Mn(A_{min})]$ is 3 or more.

* * * * *